United States Patent
Averin et al.

(10) Patent No.: US 10,775,513 B1
(45) Date of Patent: Sep. 15, 2020

(54) HIGH PERFORMANCE POSITIONING SYSTEM BASED ON GNSS RECEIVER WITH MULTIPLE FRONT ENDS

(71) Applicant: Topcon Positioning Systems, Inc., Livermore, CA (US)

(72) Inventors: Sergey Vladislavovich Averin, Moscow (RU); Mikhail Yurievich Vorobiev, Moscow (RU); Andrey Valerievich Plenkin, Moscow (RU); Danila Svyatoslavovich Milyutin, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 232 days.

(21) Appl. No.: 16/088,731

(22) PCT Filed: Apr. 18, 2018

(86) PCT No.: PCT/RU2018/000242
§ 371 (c)(1),
(2) Date: Sep. 26, 2018

(87) PCT Pub. No.: WO2019/203679
PCT Pub. Date: Oct. 24, 2019

(51) Int. Cl.
*G01S 19/04* (2010.01)
*G01S 19/55* (2010.01)
(Continued)

(52) U.S. Cl.
CPC .............. *G01S 19/55* (2013.01); *G01S 19/36* (2013.01); *G01S 19/41* (2013.01); *G01S 19/44* (2013.01)

(58) Field of Classification Search
CPC .......... G01S 19/04; G01S 19/05; G01S 19/55; G01S 19/36; G01S 19/41; G01S 19/44; G01S 19/43
(Continued)

(56) References Cited

U.S. PATENT DOCUMENTS

| 10,054,687 B2 * | 8/2018 | Whitehead | H04K 3/90 |
| 2006/0209634 A1 * | 9/2006 | Vigen | G01V 1/3835 |
| | | | 367/21 |

(Continued)

FOREIGN PATENT DOCUMENTS

| CN | 102230971 A | 11/2011 |
| CN | 102565834 B | 9/2015 |

OTHER PUBLICATIONS

Search Report in PCT/RU2018/000242, dated Dec. 27, 2018.

*Primary Examiner* — Harry K Liu
(74) *Attorney, Agent, or Firm* — Bardmesser Law Group

(57) ABSTRACT

A high performance attitude determination system, including a global navigation satellite system (GNSS) receiver, the receiver including a first radio-frequency front-end (RF1) connected to a main antenna; a second radio-frequency front-end (RF2) connected to an auxiliary antenna; and a digital section connected to both RF1 and RF2. The digital section (i) generates a first set of GNSS raw measurements based on signals received from RF1; (ii) generates a second set of GNSS raw measurements based on signals received from RF2; (iii) computes a spatial attitude of a baseline between main and auxiliary antennas, using the first and the second sets of GNSS raw measurements, and based on carrier phase integer ambiguity resolution; (iv) continues updating the spatial attitude using the first and the second sets of GNSS raw measurements without carrier phase integer ambiguity resolution, and using fractional carrier phases. Optionally, RF1 and RF2 use a common clock.

23 Claims, 11 Drawing Sheets

(51) Int. Cl.
    *G01S 19/36*          (2010.01)
    *G01S 19/41*          (2010.01)
    *G01S 19/44*          (2010.01)

(58) Field of Classification Search
    USPC .................................................... 342/357.41
    See application file for complete search history.

(56)                 References Cited

U.S. PATENT DOCUMENTS

2010/0109944 A1    5/2010   Whitehead et al.
    2016/0334804 A1   11/2016   Webber et al.
    2017/0089968 A1*   3/2017   Bagul .................... G01R 29/10

* cited by examiner

HIGH PERFORMANCE POSITIONING SYSTEM BASED ON GNSS RECEIVER WITH MULTIPLE FRONT ENDS

BACKGROUND OF THE INVENTION

Field of the Invention

The present invention relates generally to global navigation satellite systems, and more particularly, to a method and apparatus for determining position with high accuracy and reliability.

Background of the Related Art

The equipment that receives signals of global navigation satellite systems (GNSSs) can determine target parameters, such as position, velocity, time (PVT), or attitude/orientation (if multiple antennas are used). Examples of currently deployed global navigation satellite systems include Global Positioning System (GPS) of the United States of America and the GLONASS of Russian Federation. Other global navigation satellite systems, such as the European GALILEO and the Chinese Beidou, are under development. In a GNSS, a navigation receiver receives and processes radio signals transmitted by satellites located within a line-of-sight of the receiver. The satellite signals comprise carrier signals modulated by pseudo-random binary codes. The receiver measures the time delays of the received signals relative to a local reference clock, or oscillator. Code phase measurements enable the receiver to determine the pseudo-ranges between the receiver and the satellites. The pseudo-ranges differ from the actual ranges (distances) between the receiver and the satellites due to an offset, caused by the shift between the time scales of the GNSS and the receiver. Measured pseudo-ranges along with other parameters, measured by receiver are referred to as raw measurement data. If signals are received from a sufficiently large number of satellites, then the measured pseudo-ranges can be processed to determine the coordinates and the offset caused by the shift between the time scales of the GNSS and the receiver. This operational mode is referred to as a stand-alone mode, since the measurements are determined by a single receiver. A stand-alone system typically provides a position accuracy of about a meter.

To improve the position accuracy, differential navigation (DN) systems have been developed. In a DN system, the position of a user is determined relative to a base station, also referred to as a base. The base is typically fixed, and the coordinates of the base are precisely known; for example, by surveying. The base contains a navigation receiver that receives satellite signals and that can compute the corrections to GNSS measurements based on the known base position. In some DN systems, the raw measurement data of the base can serve as corrections.

The user, whose position is to be determined, can be stationary or mobile. In a DN system, the user is often referred to as a rover. The rover also contains a navigation receiver that receives GNSS satellite signals. Corrections generated at the base are transmitted to the rover via a communications link. To accommodate a mobile rover, the communications link is often a wireless link. The rover processes the corrections received from the base, along with measurements taken with its own receiver, to improve the accuracy of determining its position. Accuracy is improved in the differential navigation mode because errors incurred by the receiver at the rover and by the receiver at the base are highly correlated. Since the coordinates of the base are accurately known, measurements from the base can be used for calculating corrections, thus compensating for the errors at the rover. If a DN system generates corrections to pseudo-ranges measured with code phase only, such a DN system is capable to provide a position accuracy on the order of tens of centimeters.

The position accuracy achieved with data generated by a DN system can be further improved, if a DN system, in addition to corrections based on pseudo-ranges measured with code phase, generates corrections based on pseudo-ranges measured with carrier phase. Carrier phase measurements along with code phase measurements are a part of raw measurement data, generated by the receiver. Improvement in positioning accuracy is achieved because pseudo-ranges measured with carrier phase have ~100 times smaller noise and multipath measurement errors, compared with pseudo-ranges measured with code phase. A differential navigation system that computes positions based on real-time carrier phase pseudo-range measurements, in addition to the code phase pseudo-range measurements, is often referred to as a real-time kinematic (RTK) system.

Processing carrier phase measurements to determine coordinates in RTK system includes the step of ambiguity resolution (AR); that is, determining the integer number of cycles in the measured carrier phase pseudo-ranges.

As a result of a DN system operation, the position of a rover is determined with an improved accuracy, but this accuracy is relative, and depends on accuracy of the base position. So, any offset of the known base position from the truth will translate into the same offset of a rover position. In other words, components of the "base-to-rover" vector can be determined precisely in a given reference frame, and then, these components should be applied to base position (not necessarily precise) in order to compute position of the rover.

In addition to just positioning, in a DN system, a spatial attitude of the rover with respect to a base can be computed, based on components of the "base-to-rover" vector. This principle is a foundation of attitude determination systems utilizing GNSS measurements.

In such attitude determination systems utilizing GNSS measurements, the base and rover (or rovers) have two (or more) receivers installed onto the same object (machine, vessel, engineering structure, etc.). An absolute baseline length between such base and rover (rovers) is known (e.g., measured manually). So, the task of the attitude determination system is to compute components of the "base-to-rover" vector, using known baseline length value, and transform the result into attitude parameters of interest.

In U.S. Pat. No. 8,872,700B2, "GNSS Surveying Receiver with Multiple RTK Engines" an approach is described where within a receiver with a single front-end, several RTK engines are run, each tuned differently, and one combined solution is formed.

In U.S. Pat. No. 9,035,826B2, "Satellite Differential Positioning Receiver Using Multiple Base-Rover Antennas" an RTK system is described, where a base has minimum 2 antennas, a rover has minimum 2 antennas and an attitude determination device, and rover determines its position based on multiple baselines between several base antennas and several rover antennas, and a known attitude of the rover.

In U.S. Pat. No. 6,311,127B1, "Satellite Navigation System Having Redundant Signal Processing and Matched Filtering" an approach is described where within a receiver with a single front-end, two signal processors are run, providing slightly different raw measurement data to the same navigation processor that performs fault detection and forms a combined solution.

In U.S. Pat. No. 8,583,315B2, "Multi-antenna GNSS Control System and Method" a system is described, that uses an array of GNSS antennas coupled with different receivers, connected to each other to control the machine.

In U.S. Pat. No. 8,271,194B2, "Method and System Using GNSS Phase Measurements for Relative Positioning" an approach is described where two GNSS receivers, synchronized with the same clock are connected to antenna switcher, providing capability to form different baselines within the same carrier (vehicle or vessel) and determine its directional attitude, shape, etc.

If carrier phases are used in any type of a DN system, AR process is inevitable to get the best accuracy of results. A process of AR is probabilistic. This means there is always a non-zero probability of incorrect ambiguity resolution, which could lead to imprecise positioning, or attitude determination results.

As such, there is a need in the art for methods and apparatuses that provide high performance, what means reliable positioning results based on fast and correct ambiguity resolution.

SUMMARY OF THE INVENTION

Accordingly, the present invention is directed to a high performance positioning system based on multiple antennas and a common clock, that substantially obviates one or more of the disadvantages of the related art.

In one aspect, there is provided a high performance attitude determination system, including a global navigation satellite system (GNSS) receiver, the receiver including a first radio-frequency front-end (RF1) connected to a main antenna; a second radio-frequency front-end (RF2) connected to an auxiliary antenna; and a digital section connected to both RF1 and RF2. The digital section (i) generates a first set of GNSS raw measurements based on signals received from RF1; (ii) generates a second set of GNSS raw measurements based on signals received from RF2; (iii) computes a spatial attitude of a baseline between main and auxiliary antennas, using the first and the second sets of GNSS raw measurements, and based on carrier phase integer ambiguity resolution; (iv) continues updating the spatial attitude using the first and the second sets of GNSS raw measurements without carrier phase integer ambiguity resolution, and using fractional carrier phases.

Optionally, the system includes an inertial measurement unit (IMU), wherein IMU is initialized with the spatial attitude updated in (iv), and is used to smooth the attitude determination results while updating in (iv). Optionally, the IMU is used to provide attitude determination if the process of updating the spatial attitude in (iv) has failed. Optionally, the computing of the spatial attitude in (iii) and the updating the spatial attitude in (iv) uses a known baseline length between the main and auxiliary antennas. Optionally, the updating of the spatial attitude in (iv) is based on estimating only two unknowns due to using a common clock for controlling RF1 and RF2 within the digital section.

In another aspect, there is provided a high performance positioning system including a global navigation satellite system (GNSS) receiver, the receiver including a first radio-frequency front-end (RF1) connected to a main antenna; a second radio-frequency front-end (RF2) connected to an auxiliary antenna; and a digital section connected to both RF1 and RF2. The digital section (i) generates a first set of GNSS raw measurements based on signals received from RF1; (ii) generates a second set of GNSS raw measurements based on signals received from RF2; (iii) computes coordinates of the main antenna based on the first set of GNSS raw measurements; (iv) computes coordinates of the auxiliary antenna based on the second set of GNSS raw measurements; (v) computes a spatial attitude of a baseline between main and auxiliary antennas, using the first and the second sets of GNSS raw measurements, and based on carrier phase integer ambiguity resolution; (vi) continues updating the spatial attitude using the first and the second sets of GNSS raw measurements without carrier phase integer ambiguity resolution, and using fractional carrier phases; (vii) uses the updated spatial attitude to calculate alternative coordinates of the main antenna using known coordinates of the auxiliary antenna from (iv); (viii) generates coordinates of the main antenna by averaging the coordinates of the main antenna computed in (iii) and the alternative coordinates from (vii).

Optionally, the system includes means for receiving GNSS differential correction data from a base station, wherein the coordinates of the main antenna in (iii) and the coordinates of the auxiliary antenna in (iv) are computed in differential mode, or in real-time kinematics (RTK) mode with carrier phase ambiguity resolution. Optionally, when the computing of the coordinates of the main antenna in (iii) fails due to improper ambiguity resolution, but the coordinates of the auxiliary antenna are successfully computed in (iv), and the spatial attitude is successfully updated in (vi), then the updated spatial attitude is applied in (vii) to compute the coordinates of the main antenna, without performing (viii). Optionally, the means for receiving the GNSS differential correction data is any of a network modem for receiving the differential correction data from a base station over a network, or an antenna and a separate front end for receiving the differential correction data from a base station over a wireless link. Optionally, (iii), (iv), (v), (vi), (vii) and (viii) utilize GNSS data from additional front ends. Optionally, the coordinates of the main antenna are computed in (viii) based on weighted average of the coordinates of the main antenna computed in (iii) and the alternative coordinates calculated in (vii) with weights assigned inversely proportional to estimated squared errors of the computed coordinates in (iii) and (vii). Optionally, the computing of the spatial attitude in (v) and the updating the spatial attitude in (vi) uses a known baseline length between the main and auxiliary antennas. Optionally, the updating of the spatial attitude in (vi) is based on estimating only two unknowns due to using a common clock for controlling RF1 and RF2 within the digital section. Optionally, in the process of computing coordinates of the main antenna in (viii) a consistency check is made such, that if coordinates of the main antenna computed in (iii) do not match the alternative coordinates calculated in (vii), the computed coordinates of the main antenna are either marked as inconsistent, or accompanied with an accuracy estimations proportional to that mismatch.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The attached drawings that further describe the present invention are incorporated in and constitute a part of specification, illustrate embodiments of the invention and together with the description serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

The equipment that receives signals of global navigation satellite systems (GNSSs) can operate in various operational modes. Different operational modes require equipment of different complexities capable of determining target parameters (such as position, velocity, time and attitude) with different accuracies. The types and quantities of data to be processed also depend on the operational mode. Several operational modes are summarized below.

Figure 1A:
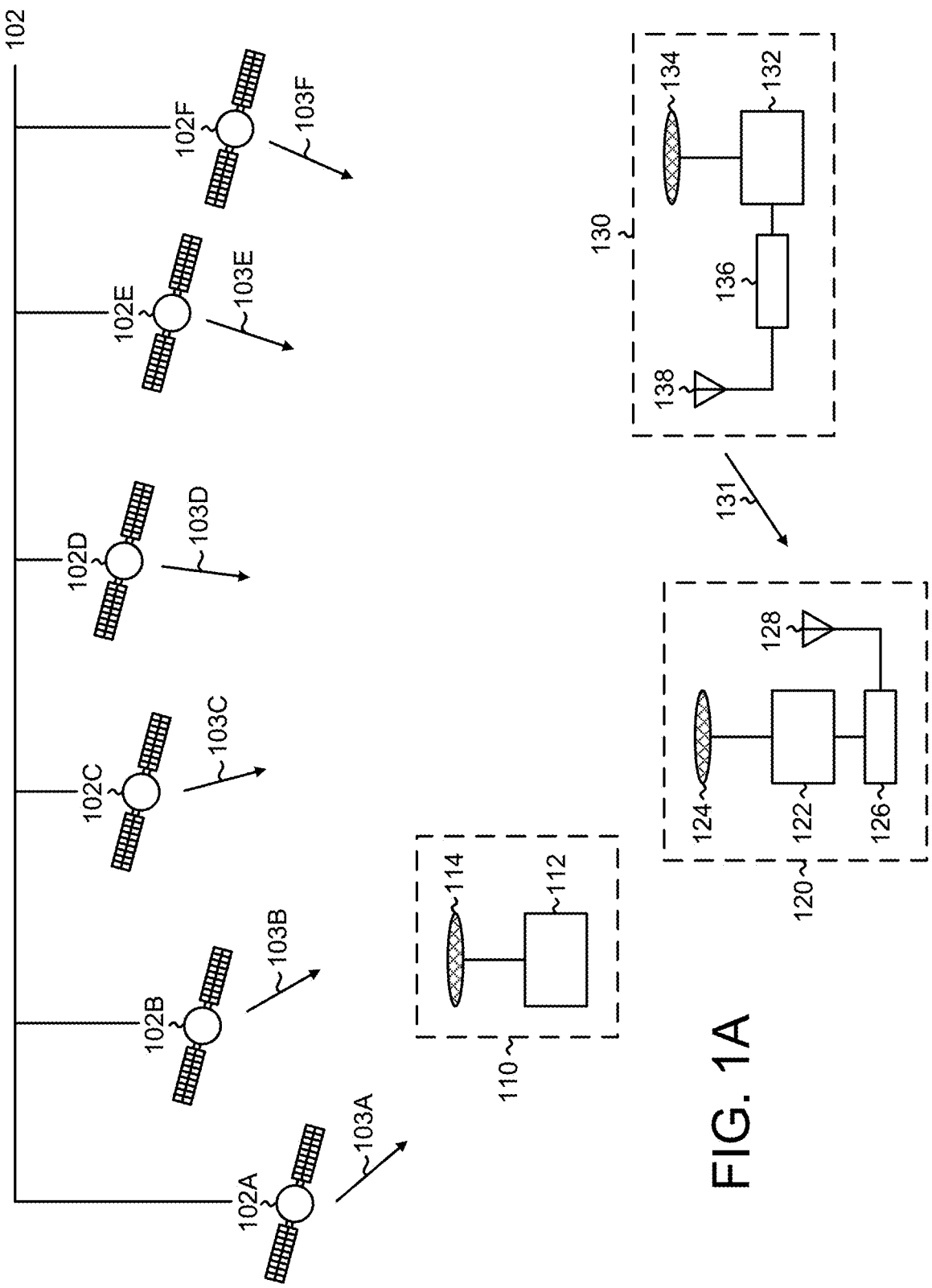
FIG. 1A shows an example of a global navigation satellite system in which the navigation receiver operates in a stand-alone mode or in a single-base-station differential navigation mode.

FIG. 1A shows a high-level schematic of a global navigation satellite system (GNSS). A constellation of global navigation satellites 102 transmits navigation signals. Shown are six representative navigation satellites, denoted 102A-102F, which transmit navigation signals 103A-103F, respectively. In general, the navigation satellites can belong to more than one global navigation satellite system (for example, GPS and GLONASS).

Referring now to the GNSS measurement unit 110, which operates in a stand-alone mode, the GNSS measurement unit 110 includes an antenna 114 and a navigation receiver 112.

The antenna 114 receives navigation signals, such as navigation signals 103A-103F; from these navigation signals, the navigation receiver 112 can calculate target parameters, such as precision time referenced to a GNSS system clock and position and velocity referenced to the antenna 114. In some GNSS measurement units, the antenna is mounted in a fixed relationship with respect to the navigation receiver. If the GNSS measurement unit 110 is carried by a person who is walking or running, the GNSS measurement unit 110 can be used to calculate the position and velocity of the person as a function of time. If the GNSS measurement unit 110 is mounted on a moving vehicle, the GNSS measurement unit 110 can be used to calculate the position and velocity of the vehicle as a function of time.

In other GNSS measurement units, the antenna can be moved with respect to the navigation receiver. In one application, the antenna 114 is mounted on the blade of a bulldozer, and the navigation receiver 112 is mounted inside the cab of the bulldozer; the antenna 114 is coupled to the navigation receiver 112 via a flexible cable. The GNSS measurement unit 110 can then be used to measure the position and velocity of the blade as a function of time. To simplify the discussion below, phrases such as "position of the navigation receiver" or "position and velocity of the navigation receiver" are used; strictly, however, "position" and "velocity" refer to the parameters of the antenna that receives the navigation signals that are then processed by the navigation receiver.

The navigation signals comprise carrier phase signals modulated by pseudo-random binary codes. The navigation receiver measures the time delays of the received signals relative to a local reference clock or oscillator. Code phase measurements enable the navigation receiver to determine the pseudo-ranges, which in essence are estimates of the distances between the navigation receiver and the navigation satellites. The pseudo-ranges differ from the actual ranges (distances) between the navigation receiver and the navigation satellites due to the offset between the time scales of the navigation receiver and the respective GNSS.

If navigation signals are received from a sufficiently large number of navigation satellites, then the measured pseudo-ranges can be processed to determine the position of the navigation receiver. In general, the three-dimensional coordinates of the navigation receiver can be determined; a reference Cartesian coordinate (x, y, z) system can be used. The reference Cartesian coordinate system can be an Earth Centered Earth Fixed (ECEF) system; WGS-84 is an example of an ECEF system. Two-dimensional coordinates along a reference horizontal plane (x-y plane) or a one-dimensional coordinate (z or height) along an axis normal to the reference horizontal plane can also be determined. The reference horizontal plane can, for example, be tangent to the WGS-84 ellipsoid. A time referenced to a GNSS system clock can also be calculated by the navigation receiver from the navigation signals (which contain timing information). Velocity of the navigation receiver can be calculated by taking the time derivative of position as a function of time, by processing Doppler measurements, or by processing carrier phase measurements over a specific interval of time.

Various error sources contribute to errors in determination of the position, velocity and time. Examples of error sources include satellite clock errors, satellite ephemeris errors, and variations in propagation velocities of the navigation signals due to the ionosphere and troposphere. Time scales of the navigation satellites are referenced to precision atomic on-board clocks and are synchronized with the GNSS time scale; however, there are residual satellite-specific drifts and offsets with respect to that GNSS time scale. Calculations of position, velocity, and time using pseudo-ranges require ephemeris data (orbital positions of the satellites); ephemeris data is encoded on the navigation signals, and is updated in real time periodically. Measured pseudo-ranges are affected by the propagation velocity of the navigation signals between the navigation satellites and the navigation receiver. The propagation velocity depends on the medium and varies as the navigation signal travels through the ionosphere and through the troposphere; instabilities in the ionosphere and troposphere can result in dynamic changes to the propagation velocity.

Some errors can be reduced by operating the GNSS in a differential navigation (DN) mode. Refer again to FIG. 1A. The GNSS measurement unit 130, also referred to as the base station (or base) 130, is fixed or stationary; its coordinates are precisely known (for example, from high-precision surveying measurements). The GNSS measurement unit 120, also referred to as the rover 120, in general is mobile.

The base station 130 includes the antenna 134 and the navigation receiver 132. The antenna 134 receives navigation signals 103A-103F. The base station 130 also includes the communications transceiver 136 and the antenna 138. Similarly, the rover 120 includes the antenna 124 and the navigation receiver 122. The antenna 124 receives the navigation signals 103A-103F. The rover 120 also includes the communications transceiver 126 and the antenna 128. The base station 130 transmits the communications signal 131 (for example, a radio frequency signal) from the antenna 138. The rover 120 receives the communications signal 131 at the antenna 128.

From the received navigation signals, the navigation receiver 132 at the base station 130 can calculate corrections to the received GNSS measurements with respect to the known position of the base station 130. In some DN systems, raw measurement data of the base station can serve as corrections. If the distance between the base station 130 and the rover 120 is relatively small, then many of the errors at the base station 130 and at the rover 120 are correlated. The base station 130 transmits error correction data to the rover 120 via the communications signal 131. The error correction data includes data that can be used to correct errors from the various error sources discussed above, for example. The rover 120 processes the navigation signals and the error correction data to determine the position of the rover 120. The accuracy with which the rover 120 can determine its position in the differential navigation mode is higher than the accuracy with which the GNSS measurement unit 110 can determine its position in the stand-alone mode.

A DN system that broadcasts correction data to code phase pseudo-range measurements is often referred to as a differential global positioning system (DGPS), or a differential global navigation satellite system (DGNSS). The position determination accuracy, achieved with help of a DN system can be further improved if correction data for code phase pseudo-ranges measurements is supplemented with the correction data for carrier phase pseudo-ranges measurements.

If the carrier phases of the signals transmitted by the same satellites are measured by both the navigation receiver in the base station and the navigation receiver in the rover, processing the two sets of carrier phase measurements can yield a position accuracy to within several percent of the carrier's wavelength. A DN system that enables positioning based on real-time carrier phase pseudo-range measurements, in addition to the code phase pseudo-range measurements, is often referred to as a real-time kinematic (RTK) system. Processing carrier phase measurements to determine position includes the step of ambiguity resolution (AR); that is, determining the integer number of cycles in the carrier phase signals received by the navigation receivers from an individual satellite.

More complex DN systems, including RTK systems, are configured as network DN systems. In a network DN system, error correction data for a rover is generated from measurements collected from a group of base stations that are geographically dispersed over a wide area. A network control center processes the measurements from the group of base stations and transmits the error correction data to the rover via various communications links, such as radiofrequency satellite signals or General Packet Radio Service (GPRS). Network DN systems can differ by application areas, data processing methodology and target positioning accuracy.

Figure 1B:
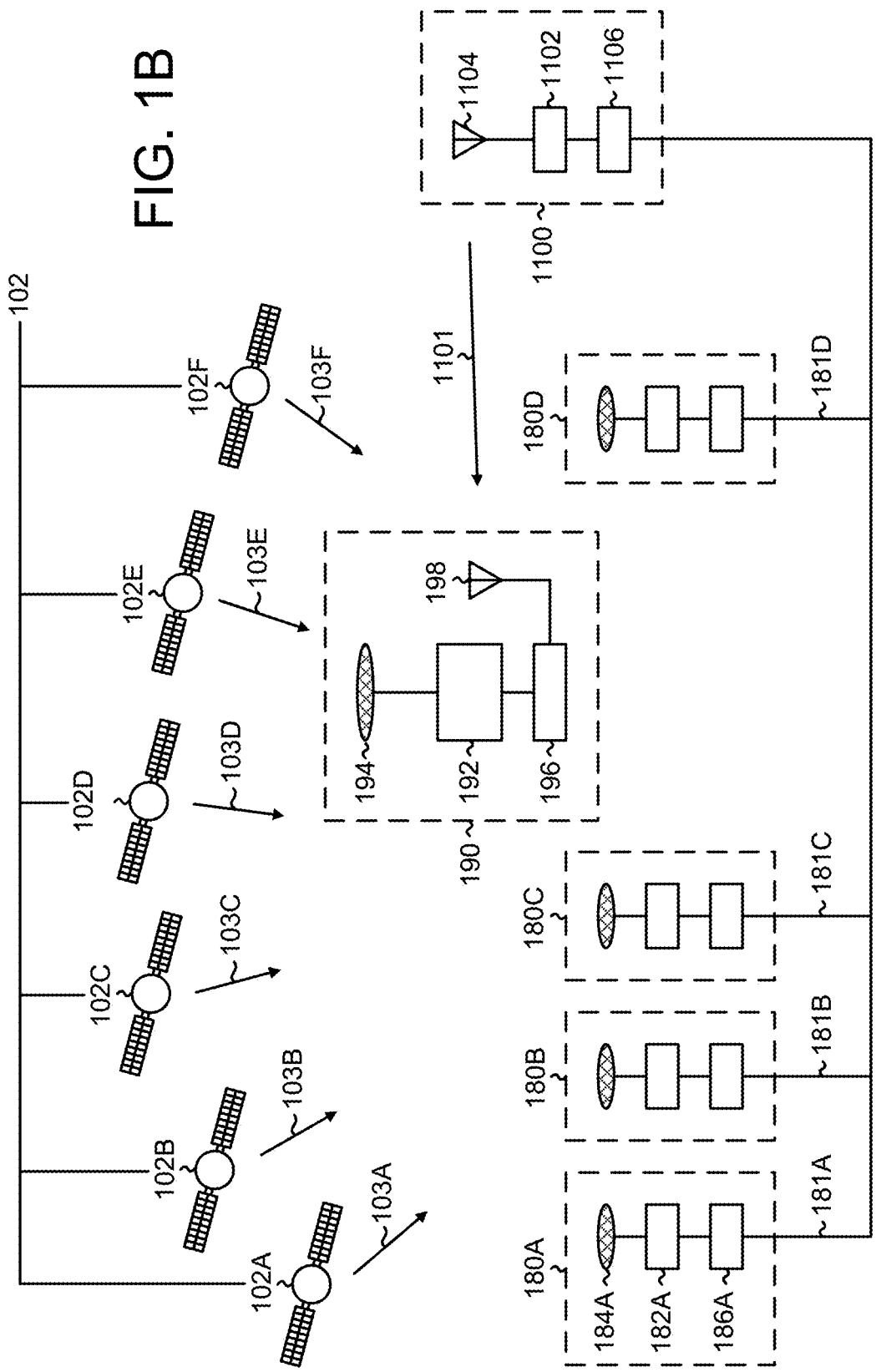
FIG. 1B shows an example of a global navigation satellite system in which the navigation receiver operates in a network differential navigation mode.

FIG. 1B shows an example of a regional (local) network DN system used to provide a network RTK solution; such systems are often referred to as Network RTK systems. Shown are the rover 190 and four representative base stations 180A-180D. The rover 190 includes the antenna 194 and the navigation receiver 192. The antenna 194 receives the navigation signals 103A-103F. The rover 190 also includes the communications transceiver 196 and the antenna 198. The base station 180A includes the navigation receiver 182A, the antenna 184A, and the data processing and communications unit 186A; base stations 180B-180D are each similar to the base station 180A.

In general, the rover and each base station can receive navigation signals from a slightly different subset of navigation satellites in the constellation 102 due to varying conditions in different locations. Operation of the rover in a network RTK mode is possible, however, only using satellite signals received simultaneously by the rover 190 and by the base stations 180A-180D.

Base stations 180A-180D transmit data 181A-181D, respectively, to the network control center (NCC) 1100. The data can be transmitted via communications links or via a communications network. The NCC 1100 includes the communications transceiver 1102, the antenna 1104, and the data processing and communications unit 1106. The NCC 1100 receives the data from the base stations, as well as the approximate position of the rover, and processes the data according to specific algorithms to generate a consolidated set of error correction data corresponding to the rover position (described in more detail below).

The NCC 1100 makes the consolidated set of error correction data available to the rover via various communication channels, such as GPRS. In FIG. 1B, the NCC 1100 delivers the consolidated set of error correction data via the communications signal 1101 (for example, a radio frequency signal) transmitted from the antenna 1104. The rover 190 receives the communications signal 1101 at the antenna 198. The rover 190 then calculates its position based on measurements collected with its receiver and the consolidated set of error correction data.

The consolidated set of error correction data in network RTK systems can be partitioned into several groups. The consolidated set of error correction data can include:
- Cumulative corrections to both code phase and carrier phase measurements from one or more individual base stations in a group of base stations;
- Corrections to code phase and carrier phase measurements for some virtual (i.e., non-existent) base station generated from processing GNSS measurements collected with a group of base stations;

Corrections representing the dispersive part of GNSS measurement errors (measurement errors attributable to the ionosphere) for measurements from one or more individual base stations in a group of base stations;

Corrections representing the non-dispersive part of GNSS measurement errors (measurement errors attributable to the troposphere, satellite ephemeris, and satellite clock data) for measurements from one or more individual base stations in a group of base stations;

Coefficients approximating how various GNSS measurement error components change in space; and Other servicing information.

Figure 1C:
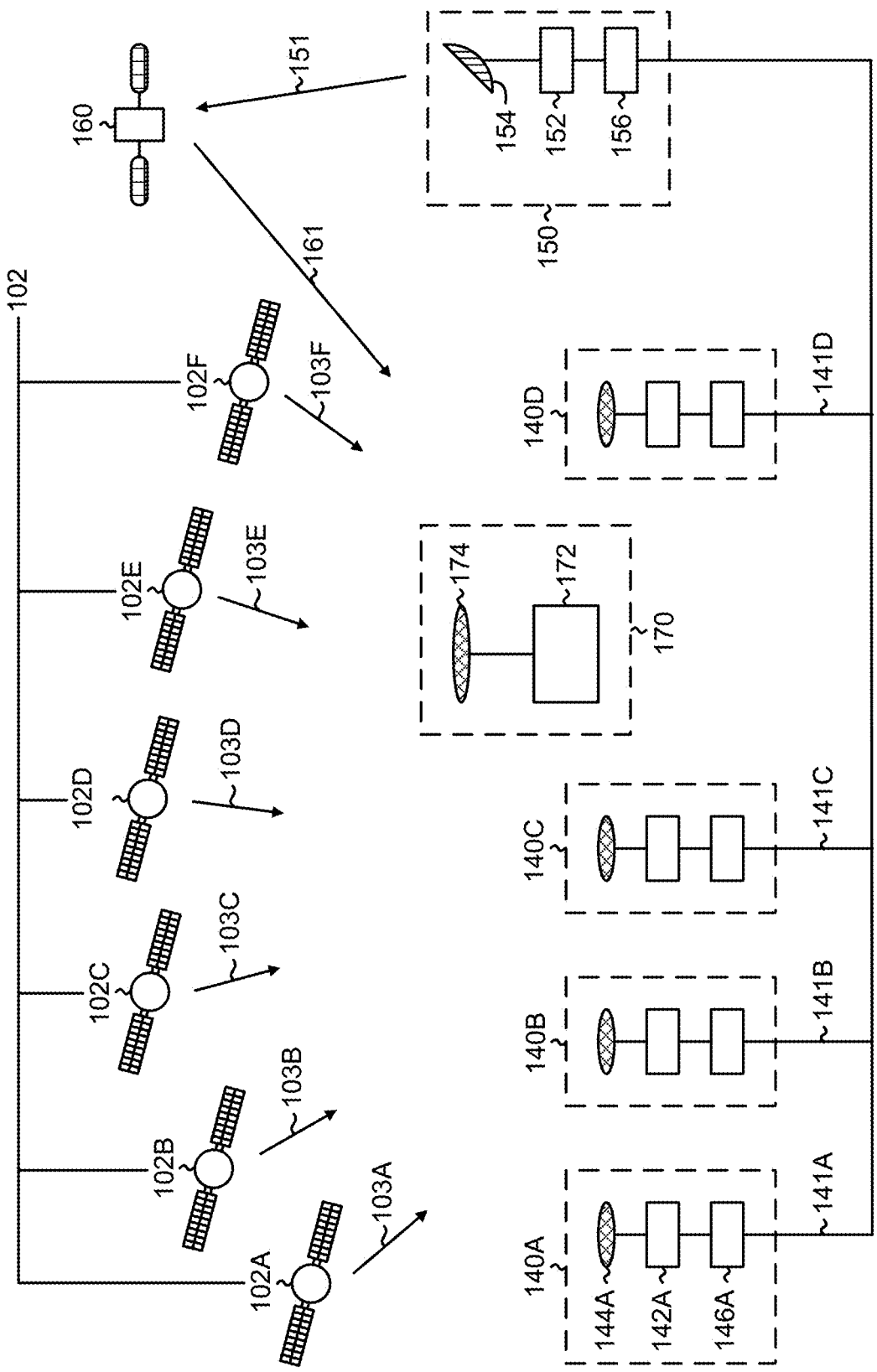
FIG. 1C shows an example of a global navigation satellite system in which the navigation receiver operates in a satellite-based network differential navigation mode.

FIG. 1C shows another example of a network DN system, referred to as a Space Based Augmentation System (SBAS). Shown are the rover 170 and four representative base stations 140A-140D. The rover 170 includes the antenna 174 and the navigation receiver 172. The base station 140A includes the navigation receiver 142A, the antenna 144A, and the data processing and communications unit 146A; base station 140B-base station 140D are each similar to the base station 140A. In general, the rover and each base station can receive navigation signals from a slightly different subset of navigation satellites in the constellation 102 due to varying conditions in different locations. Operation of the rover in a differential mode is possible, however, only using satellite signals received simultaneously by the rover 170 and by the base stations 140A-140D.

Base stations 140A-140D transmit data 141A-141D, respectively, to the network control center (NCC) 150. The data can be transmitted via communications links or via a communications network. The NCC 150 includes the satellite transmitter 152, the antenna 154, and the data processing and communications unit 156. The NCC 150 receives the data from the base stations and processes the data according to specific algorithms to generate a consolidated set of error correction data (described in more detail below). The NCC 150 transmits the consolidated set of error correction data to the geosynchronous (geostationary) relay satellite 160 via the satellite uplink channel 151.

The geosynchronous relay satellite 160 then retransmits the consolidated set of error correction data over a specific region (zone) of the Earth. Multiple geosynchronous relay satellites provide coverage for multiple zones. In FIG. 1C, the rover 170 receives the consolidated set of error correction data from the geosynchronous relay satellite 160 via the satellite signal 161. The rover 170 then calculates its position from the navigation signals and the consolidated set of error correction data. Note that the navigation receiver 172 in the rover 170 needs to be specially equipped to process the satellite signal 161.

The consolidated set of error correction data can be divided into several groups. The consolidated set of error correction data can include:

Corrections to code phase measurements from one or more individual base stations in a group of base stations;

Corrections to both code phase and carrier phase measurements from one or more individual base stations in a group of base stations;

Corrections to orbital (trajectory) parameters and clock parameters of GNSS satellites, specified in the processing of measurements from a group of base stations;

Corrections to code phase measurements for a some virtual (i.e., non-existent) base station generated from processing GNSS measurements for a group of base stations;

Corrections to code phase and carrier phase measurements for a virtual base station generated from processing GNSS measurements collected with a group of base stations; and Other error correction data.

A third example of a network DN system, referred to as Precise Point Positioning (PPP), is similar to network RTK in some aspects, but correction data is presented differently. The architecture of the PPP system is identical to that of the SBAS. Referring to FIG. 1C, a PPP system includes a network of base stations 140A-140D distributed regionally or globally. They send their data to the network control center (NCC) 150. The NCC 150 receives the data from the base stations and processes the data according to specific algorithms to generate a consolidated set of error correction data (described in more detail below). As one option, the NCC 150 can transmit the consolidated set of error correction data to the geosynchronous (geostationary) relay satellite 160 via the satellite uplink channel 151. In another option, the NCC 150 can make the consolidated set of error correction data available to a rover via the Internet.

The key distinction between the PPP system and the typical SBAS, despite similarity in infrastructure, is better accuracy. The SBAS can provide position accuracy on the order of a meter or better; whereas, the PPP system is capable of delivering decimeter level position accuracy. In certain cases, PPP correction data sets can make possible carrier phase ambiguity resolution, thus leading to centimeter level position accuracy (similar to RTK).

The consolidated set of error correction data in a PPP system can be partitioned into several groups. The consolidated set of error correction data can include:

Corrections to orbital (trajectory) parameters of GNSS satellites specified in the processing of measurements from a group of base stations;

Corrections to clock parameters of GNSS satellites, specified in the processing of measurements from a group of base stations;

Corrections for residual uncompensated errors of GNSS measurements; and

Other error correction data.

Each navigation satellite in a global navigation satellite system can transmit navigation signals on one or more frequency bands (for example, on the L1, L2, and L5 frequency bands). To simplify the terminology herein, a navigation receiver is also referred to simply as a receiver. A single-band receiver receives and processes signals on one frequency band (such as L1); a multi-band receiver receives and processes signals on two or more frequency bands (such as L1, L2, and L5). A single-system receiver receives and processes signals from a single GNSS (such as GPS); a multi-system receiver receives and process signals from two or more GNSSs (such as GPS, GLONASS, and GALILEO).

Figure 2:
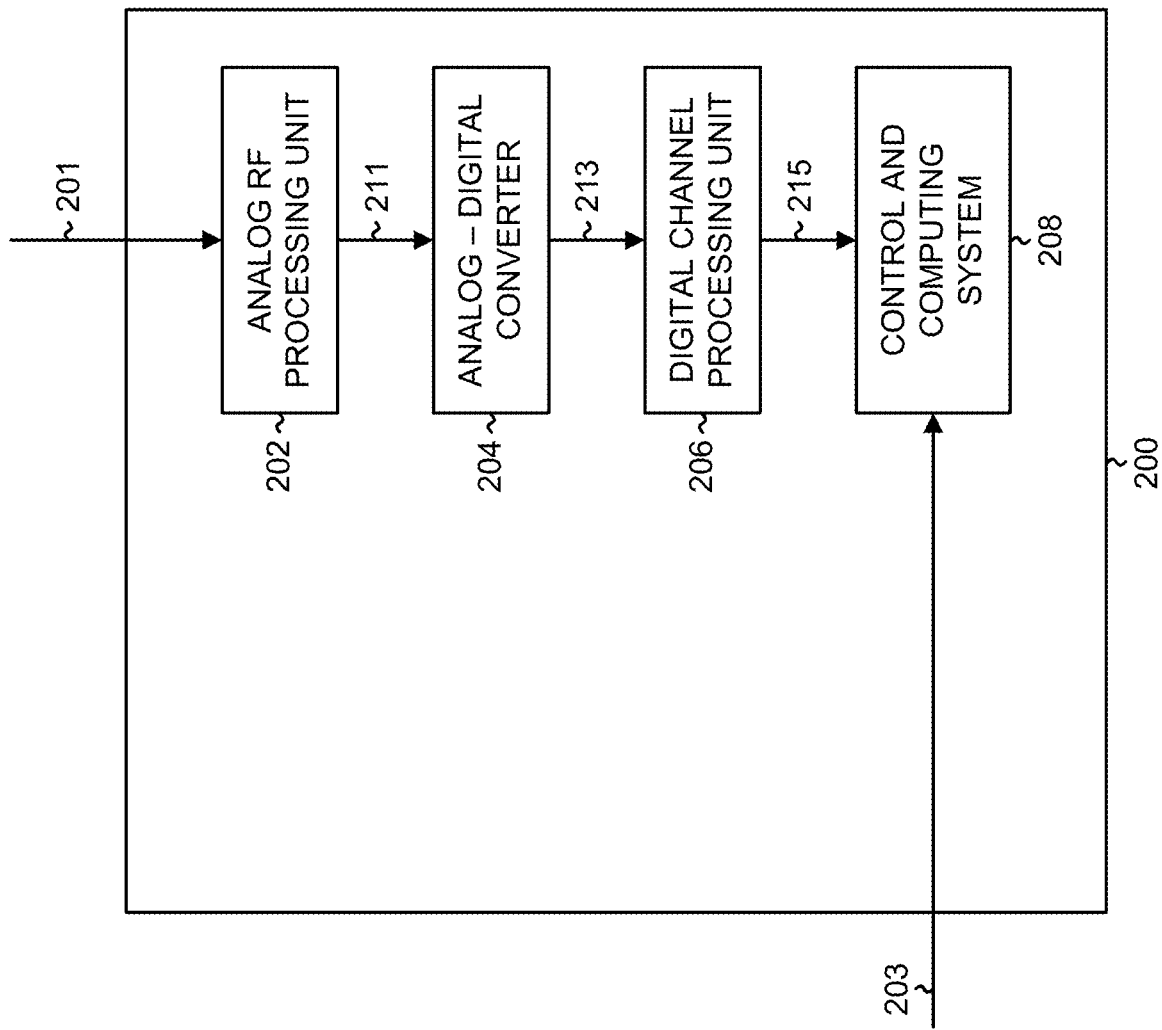
FIG. 2 shows a high-level schematic functional block diagram of a first embodiment of a navigation receiver.

FIG. 2 shows a high-level schematic functional block diagram of embodiment of a receiver 200. The input analog signal 201 represents the total signal (also referred to as the combined signal, aggregate signal, or composite signal) of all the navigation signals received by the antenna (not shown) coupled to the receiver 200. For the example shown in FIG. 1A, the input analog signal 201 includes the navigation signals 103A-103F. The input analog signal 201 is first inputted into the analog radio frequency (RF) processing unit 202. In the analog RF processing unit 202, the input analog signal 201 is amplified by a low-noise amplifier, filtered by a RF bandpass filter, and mixed with a local oscillator signal to generate an intermediate signal with an upconverted frequency and an intermediate signal with a downconverted frequency. An intermediate frequency bandpass filter removes the intermediate signal with the upconverted frequency and outputs the intermediate signal with the downconverted frequency; this output signal is denoted as the output analog signal 211.

The output analog signal 211 is input into the analog-to-digit converter (ADC) 204, which digitizes the analog signal 211. The combination of analog RF processing unit (202) and ADC (204) is commonly referred to as radio-frequency (RF) front-end (210).

The output digital signal 213 contains raw measurement data. It is then input into the digital channel processing unit 206, which processes raw measurement data to solving various navigation tasks. The raw measurement data, besides code phase and carrier phase measurements, includes GNSS information encoded on the navigation signals (such as satellite ephemeris and satellite clock parameters). The output digital signal 215 is input into the control and computing system 208, which computes target parameters such as position, velocity, and time offset.

The combination of digital channel processing unit (206) and control and computing system (208) is commonly referred to as a receiver digital section (212).

If the receiver operates in a differential navigation mode, the control and computing system 208 receives the correction data 203, used to compute target parameters with better accuracy. In the single-base-station DN system shown in FIG. 1A, the error correction data 203 would be received from the communications transceiver 126 in the rover 120. In the network DN system shown in FIG. 1B, the error correction data would be received from the communications transceiver 196 in the rover 190. In the network DN system shown in FIG. 1C, the error correction data 203 would be received from the satellite signal 161.

Figure 3:
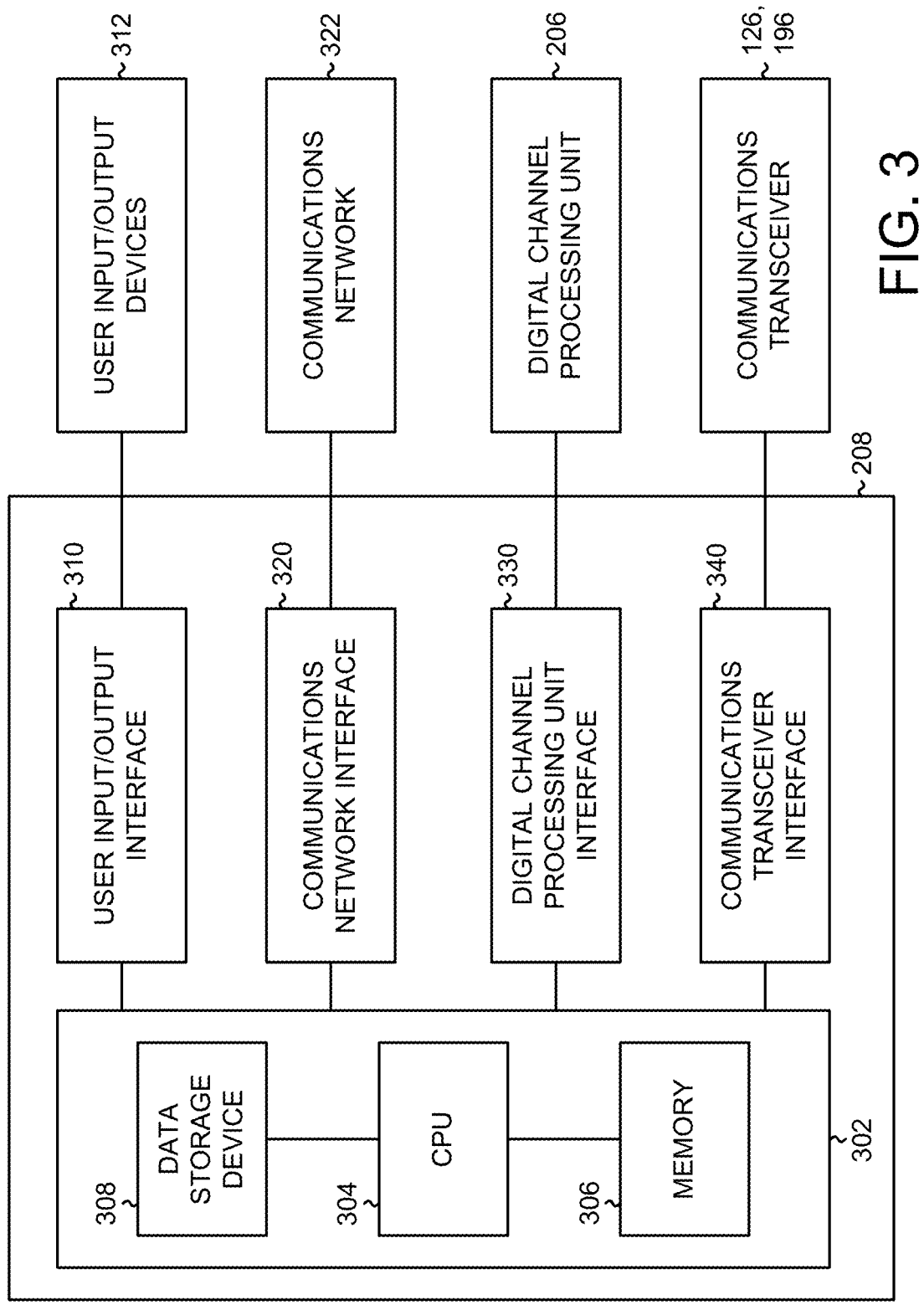
FIG. 3 shows a high-level schematic functional block diagram of a control and computing system implemented within a receiver.

An embodiment of the control and computing system 208 is shown in FIG. 3. One skilled in the art can construct the control and computing system 208 from various combinations of hardware, firmware, and software. One skilled in the art can construct the control and computing system 208 from various electronic components, including one or more general purpose processors (such as microprocessors), one or more digital signal processors, one or more application-specific integrated circuits (ASICs), and one or more field-programmable gate arrays (FPGAs).

The control and computing system 208 includes a computer 302, which includes a processor (referred to as the central processing unit (CPU)) 304, memory 306, and a data storage device 308. The data storage device 308 includes at least one persistent, non-transitory, tangible computer readable medium, such as non-volatile semiconductor memory, a magnetic hard drive, or a compact disc read only memory.

The control and computing system 208 further includes a user input/output interface 310, which interfaces the computer 302 to user input/output devices 312. Examples of user input/output devices 312 include a keyboard, a mouse, a local access terminal, and a video display. Data, including computer executable code, can be transferred to and from the computer 302 via the user input/output interface 310.

The control and computing system 208 further includes a communications network interface 320, which interfaces the computer 302 with a communications network 322. Examples of the communications network 322 include a local area network and a wide area network. A user can access the computer 302 via a remote access terminal (not shown) communicating with the communications network 322. Data, including computer executable code, can be transferred to and from the computer 302 via the communications network interface 320.

The control and computing system 208 further includes a digital channel processing unit interface 330, which interfaces the computer 302 with the digital channel processing unit 206 (see FIG. 2).

The control and computing system 208 further includes a communications transceiver interface 340, which interfaces the computer 302 with a communications transceiver, such as the communications transceiver 126 (see FIG. 1A) or the communications transceiver 196 (see FIG. 1B).

As is well known, a computer operates under control of computer software, which defines the overall operation of the computer and applications. The CPU 304 controls the overall operation of the computer and applications by executing computer program instructions that define the overall operation and applications. The computer program instructions can be stored in the data storage device 308 and loaded into the memory 306 when execution of the program instructions is desired. The algorithms described below can be defined by computer program instructions stored in the memory 306 or in the data storage device 308 (or in a combination of the memory 306 and the data storage device 308) and controlled by the CPU 304 executing the computer program instructions. For example, the computer program instructions can be implemented as computer executable code programmed by one skilled in the art to perform algorithms. Accordingly, by executing the computer program instructions, the CPU 304 executes the algorithms described below.

Figure 4:
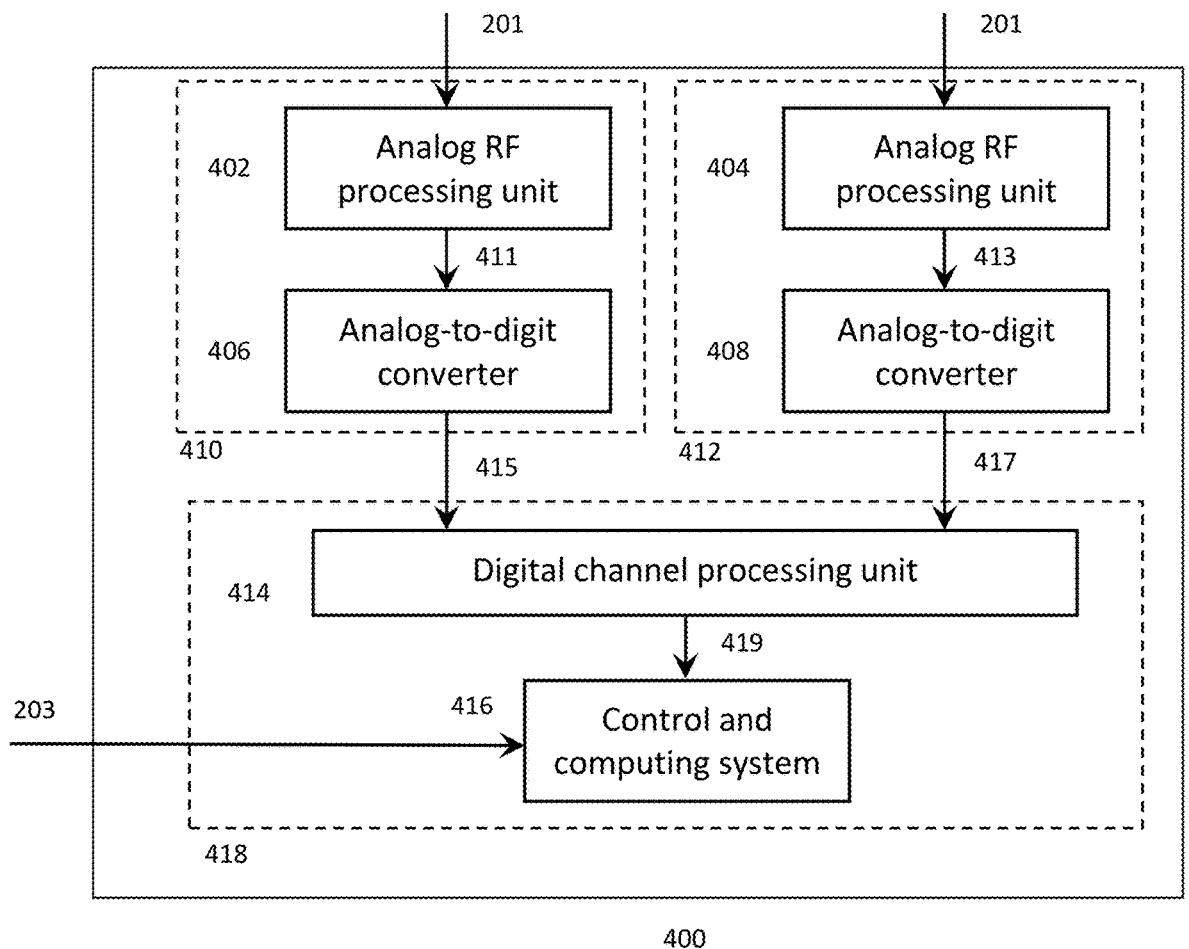
FIG. 4 shows a high-level schematic functional block diagram of a second embodiment of a navigation receiver with multiple front-ends.

FIG. 4 shows a high-level schematic functional block diagram of embodiment of a receiver, denoted as the receiver 400. This receiver has two frontends and a single digital section. One skilled in the art can draw a similar diagram for a receiver with more than two frontends and a single digital section.

The input analog signal 201 represents the total signal of all the received navigation signals. For the example shown in FIG. 1A, the input analog signal 201 includes the navigation signals 103A-103F. For the receiver 400 analog signal 201 is measured with two antennas (not shown) coupled to the receiver 400. For a receiver with more than two frontends, the number of antennas is typically equal to the number of frontends.

For the receiver 400, the input analog signal 201 is first inputted into the analog radio frequency (RF) processing units 402 and 404. In the analog RF processing units 402 and 404, the input analog signal 201 is amplified by a low-noise amplifiers, filtered by a RF bandpass filters, and mixed with a local oscillator signal to generate an intermediate signal with an upconverted frequency and an intermediate signal with a downconverted frequency. An intermediate frequency bandpass filters remove the intermediate signal with the upconverted frequency and outputs the intermediate signal with the downconverted frequency. Such output signals are denoted as the output analog signals 411 and 413.

The output analog signals 411 and 413 are input into the analog-to-digit converters (ADC) 406 and 408, which digitize the analog signal 211. The combinations of analog RF processing units 402 with ADC 406, or 404 with 408 are commonly referred to as RF front-ends (410, or 412).

The output digital signals 415 and 417 are then input into the digital channel processing unit 414, which processes navigation data used for solving navigation tasks. The navigation data includes GNSS information (such as satellite ephemeris and satellite clock parameters) encoded on the navigation signals. The navigation data also includes code phase measurements (that is, delay times used to determine pseudo-ranges) calculated from delay-locked loops (DLLs). If the navigation receiver processes carrier phases, the navigation data also includes carrier phase measurements calculated from phase-locked loops (PLLs). The output digital signal 419 is input into the control and computing system 416, which computes target parameters such as position, velocity, time offset, and attitude.

The combination of digital channel processing unit 414 and control and computing system 416 is commonly referred to as receiver digital section (418).

If the receiver 400 operates in a differential navigation mode, the control and computing system 416 receives the error correction data 203, used to compute target parameters with better accuracy. In the single-base-station DN system shown in FIG. 1A, the error correction data 203 would be received from the communications transceiver 126 in the rover 120. In the network DN system shown in FIG. 1B, the error correction data would be received from the communications transceiver 196 in the rover 190. In the network DN system shown in FIG. 1C, the error correction data 203 would be received from the satellite signal 161.

In GNSS-related applications, time is measured with respect to a common GNSS system time. Each GNSS has a central synchronizer performing GNSS timekeeping functions. This central synchronizer is typically implemented with a highly stable atomic oscillator located underground in a shielded room. The central synchronizer is also referred to as the GNSS system clock, and the time referenced to the GNSS system clock is the GNSS system time.

Each GNSS satellite and each navigation receiver has its own local reference clock. The local reference clock in a receiver is typically a quartz oscillator, which can have variations in frequency and phase much greater than those of the GNSS system clock. The time referenced to a local clock in a receiver is also referred to as the receiver time scale. The clock in a satellite is typically an atomic clock, more stable than the clock in a receiver, but less stable than the GNSS system clock. The satellite clock is synchronized with the GNSS system clock via periodic measurement sessions made by the GNSS ground control complex. Results of these measurements are the corrections to the satellite clock; values of the corrections are uploaded to the satellite and are broadcast to users. Corrections to the satellite clock calculated by the ground control complex are not absolutely precise, however, because measurements and calculations can have particular errors and because the current drift of the satellite oscillator may not be well represented with the corrections calculated at some time in the past; consequently, there is an offset of the satellite time scale with respect to the GNSS system time.

The difference in time determined by a local clock in a receiver or satellite and the time determined by the GNSS system clock is referred to as the offset of the time scale or as the clock offset.

In order to achieve the highest precision in determination of target parameters, carrier phase measurements shall be used. This holds true for both position and attitude. The data processing algorithms are now described.

To compute the position, RTK algorithms are used. The main problem of any RTK algorithm is to resolve integer carrier phase ambiguities. The success of this process is dependent on GNSS satellite geometry and measurement errors. The success here means that ambiguities are resolved to correct integers as fast as possible. If ambiguities are resolved correctly, carrier phases with extracted ambiguities are used to compute the solution, and this solution will have the accuracy of cm-level.

The first step of data processing, preceding ambiguity resolution (AR) is differencing base and rover measurements. Such differences are commonly referred to as the "1-st differences".

$$\Delta C^j = C_B^j - C_R^j = R_B^j - R_R^j + \Delta T^j + \Delta I^j + \Delta e^j + \Delta \tau^j + B_C + \Delta \xi^j \quad (1)$$

$$\Delta P^j = P_B^j - P_R^j = R_B^j - R_R^j + \Delta T^j - \Delta I^j + \Delta e^j + \Delta \tau^j + B_P + \Delta N^j \times \lambda^j + \Delta \eta^j \quad (2)$$

Where:
$\Delta$—differencing operator
$j$—index of GNSS satellite
$C_B^j$, $C_R^j$—code phase pseudo-range measurements made at base and rover respectively, with j-th GNSS satellite
$P_B^j$, $P_R^j$—carrier phase pseudo-range measurements made at base and rover respectively, with j-th GNSS satellite
$R_B^j$, $R_R^j$—true distances between base and j-th GNSS satellite, and rover and j-th GNSS satellite respectively
$\Delta T^j$—difference of signal delays due to troposphere between base and rover with respect to j-th GNSS satellite
$\Delta I^j$—difference of signal delays due to ionosphere between base and rover with respect to j-th GNSS satellite
$\Delta e^j$—difference of GNSS ephemeris errors projections onto distances between base and j-th GNSS satellite, and rover and j-th GNSS satellite
$\Delta \tau^j$—difference of GNSS clock error impacts onto distances between base and j-th GNSS satellite, and rover and j-th GNSS satellite
$B_C$—various biases common for code phase measurement difference of all GNSS satellites (including difference of receiver clock offsets between base and rover)
$B_P$—various biases common for carrier phase measurement difference of all GNSS satellites (including difference of receiver clock offsets between base and rover)
$\Delta N^j$—difference of carrier phase ambiguities between measurements made at base and rover with j-th GNSS satellite
$\lambda^j$—wavelength of carrier phase measurements of the j-th GNSS satellite
$\Delta \xi^j$—difference of code noise and code multipath errors
$\Delta \eta^j$—difference of carrier noise and carrier multipath errors As result of differencing mutual errors of base and rover cancel out, being correlated. In fact, if the correlation is strong enough (which basically holds true for short baselines) equations (1) and (2) for the 1-st differences can be re-written as follows:

$$\Delta C^j = C_B^j - C_R^j = R_B^j - R_R^j + B_C + \Delta \xi^j \quad (3)$$

$$\Delta P^j = P_B^j - P_R^j = R_B^j - R_R^j + B_P + \Delta N^j \times \lambda^j + \Delta \eta^j \quad (4)$$

However, the longer the distance, the less correlated measurements are between base and rover. This leads to appearance of certain biases in equations (3) and (4) for the 1-st differences, which transform to equations (5) and (6) below.

$$\Delta C^j = C_B^j - C_R^j = R_B^j - R_R^j + B_C + b_c^j + \Delta \xi^j \quad (5)$$

$$\Delta P^j = P_B^j - P_R^j = R_B^j - R_R^j + B_P + \Delta N^j \times \lambda^j + b_p^j + \Delta \eta^j \quad (6)$$

where:
$b_c^j$ and $b_p^j$—code and carrier biases respectively
When equations (3) and (4) are solved within an equation system, the unknowns, basically, are x, y, z—coordinates of rover with respect to position of base in any of the reference frames;

$B_C$, $B_P$—biases in code phase and carrier phase measurement differences respectively, common for all GNSS satellites;

ΔN—vector of carrier phase ambiguities, whose resolution is a target of AR

Within single-difference approach, biases $B_C$, $B_P$ are to be evaluated as additional unknowns.

Also, there is a known approach where instead of the 1-st differences, the so called "2-nd" differences are used. In order to generate the 2-nd differences, one of the GNSS satellites is selected as the reference one. As result of forming 2-nd differences bias terms $B_C$ and $B_P$ cancel out.

Imagine that a k-th GNSS satellite was chosen as the reference, then, equations (5) and (6) for any j-th GNSS satellite are transformed as follows:

$$\nabla\Delta C^{k,j} = \quad (7)$$
$$C_B^k - C_R^k - C_B^j + C_R^j = R_B^k - R_R^k - R_B^j + R_R^j + b_c^k - b_c^j + \Delta\xi^k - \Delta\xi^j ==$$
$$\nabla\Delta R^{k,j} + \nabla\Delta b_c^{k,j} + \nabla\Delta\xi^{k,j}$$

$$\nabla\Delta P^{k,j} = P_B^k - P_R^k - P_B^j + P_R^j = \quad (8)$$
$$R_B^k - R_R^k - R_B^j + R_R^j + \Delta N^k \times \lambda^k - \Delta N^j \times \lambda^j + b_p^k - b_p^j +$$
$$\Delta\eta^k - \Delta\eta^j = \nabla\Delta R^{k,j} + \nabla\Delta N^{k,j} \times \lambda + \nabla\Delta b_p^{k,j} + \nabla\Delta\eta^{k,j}$$

where:

∇Δ—double difference operator;

$\lambda^k = \lambda^j = \lambda$ for GNSS with code division multiple access (CDMA).

The task of AR is to evaluate integer values of $\Delta N^j$ or $\nabla\Delta N^{k,j}$. Let us consider the standard algorithm for AR, applicable for RTK case. Example of such a description can be found for instance in *The LAMBDA Method for Integer Ambiguity Estimation: Implementation Aspects*, by Paul de Jonge and Christian Tiberius, published by LGR-Series Publications of the Delft Geodetic Computing Centre No. 12.

Within the typical AR algorithm, including those of RTK, the following steps are present, though one skilled in the art can build this algorithm differently:

generating "second" differences between base and rover code phase and carrier phase measurements, choosing one of the satellites as the reference (as per equations 7 and 8);

evaluating carrier phase ambiguities of differenced measurements as floating point values ("float ambiguities");

evaluating carrier phase ambiguities of differenced measurements as integer values and forming sets of ambiguities to be checked for optimality;

checking integer ambiguity sets in order to come to conclusion if this is the optimum set, i.e., one which is capable to provide the most accurate position;

if ambiguity set passes certain criteria, it can be used for positioning, such ambiguities are called "fixed ambiguities";

upon finding the optimum integer ambiguity set (i.e., fixing, or, resolving ambiguities)—excluding these integers out of carrier phase measurement differences, thus correcting them;

generating position estimates with carrier phase differences, corrected for fixed ambiguities;

with every new measurement set—checking fixed ambiguities for consistency, and if consistency check fails—attempting to resolve ambiguities anew.

One skilled in the art can build AR algorithm based on single differences, in this case, carrier phase ambiguity of the reference satellite is treated to be zero.

If the positioning solution is achieved with fixed ambiguities, this solution is called 'fixed' solution. This implies that position is estimated with the best accuracy.

Various fix criteria are known in the art for choosing the proper carrier phase ambiguity set. The most widely used are the minimum of the quadratic form for ambiguities, and a "Contrast Ratio" (see e.g., D. Milyutin and A. Plenkin, US Patent Application Publication No. 2011/0115669, "Detection and Correction of Anomalous Measurements and Ambiguity Resolution in a Global Navigation Satellite System"). One skilled in the art can also use other criteria.

The minimum of the quadratic form criteria is based on analysis of the value computed according to the following formula:

$$q = (M-\tilde{M})^T D (M-\tilde{M}) \quad (9)$$

where q—quadratic form value $\tilde{M}$—float ambiguities vector, estimated in the process of ambiguity resolution M—candidate integer ambiguities vector D—information matrix obtained as result of Z-transformation of covariance matrix of ambiguities Among various ambiguity sets, those two are selected that form the minimum value of q (q1), and the second minimum value of q (q2). They both are used to form a "Contrast Ratio":

$$C = q2/q1 \quad (10)$$

The "Contrast Ratio" criterion is based on an assumption that if the value of C is bigger than a predefined threshold, the ambiguity set used to form q1 can be treated as the optimum one, ambiguity resolution is finished, and resolved ambiguities can be used to generate the final solution. If the value of C is less than or equal to a predefined threshold, the process of ambiguity resolution continues.

Ambiguity resolution process is often not instantaneous, and it can take hundreds of measurement epochs to come to reliable conclusion on optimality of the candidate measurement set.

In certain cases criteria that are similar to the minimum of the quadratic form, or to the "Contrast Ratio" could lead to the wrong results. These criteria might be satisfied, but the associated ambiguity set might be wrong, and its use might lead to unacceptable positioning errors, greater than expected for this mode. For instance, positioning errors might be on the order of few meters or more, while centimeter-level errors are expected. Such situations are called wrong ambiguity resolutions. A solution that is achieved with a wrong ambiguity set is often referred to as an "outlier".

The less time is required to resolve the ambiguities, and the fewer outliers are outputted, the more efficient, and the more reliable the process of AR is. Different factors affect time to fix and the reliability of AR.

First, the time to fix and the reliability of AR depend on the value of biases present in "base-minus-rover" differences $\Delta b_c^j$ and $\Delta b_p^j$ (as per equations 5 and 6), or $\nabla\Delta b_c^{k,j}$ and $\nabla\Delta b_p^{k,j}$ (as per equations 7 and 8).

Second, increased carrier phase noise and multipath ($\Delta\eta^j$ and $\nabla\Delta\eta^{k,j}$) could lead to a longer time to fix and less reliable AR.

Third, if a number of available satellite measurements is reduced due to signal blocking or interference, this could lead to the fact that a system of equations (6) or (8) is poorly determined, resulting in a longer time to fix and a less reliable AR.

The object of the present invention is to improve positioning performance, that is, to improve time-to-fix, reduce the probability of wrong ambiguity resolution and improve the accuracy of target parameters determined as result of AR.

This object is achieved with a use of a system, that includes a GNSS receiver having two or more front ends and a single digital section, augmented with specific algorithms, combining either raw measurement data, or RTK solutions, acquired with two (or more) different antennas.

As noted above, the apparatus described in the embodiments of the present invention includes two or more front ends, and a common digital section, as such, two or more sets of independent measurements are generated for the same set of GNSS satellites. The functional diagram is shown in FIG. 5, where 503 is an apparatus (receiver unit) with two front-ends, mentioned above.

Figure 5:
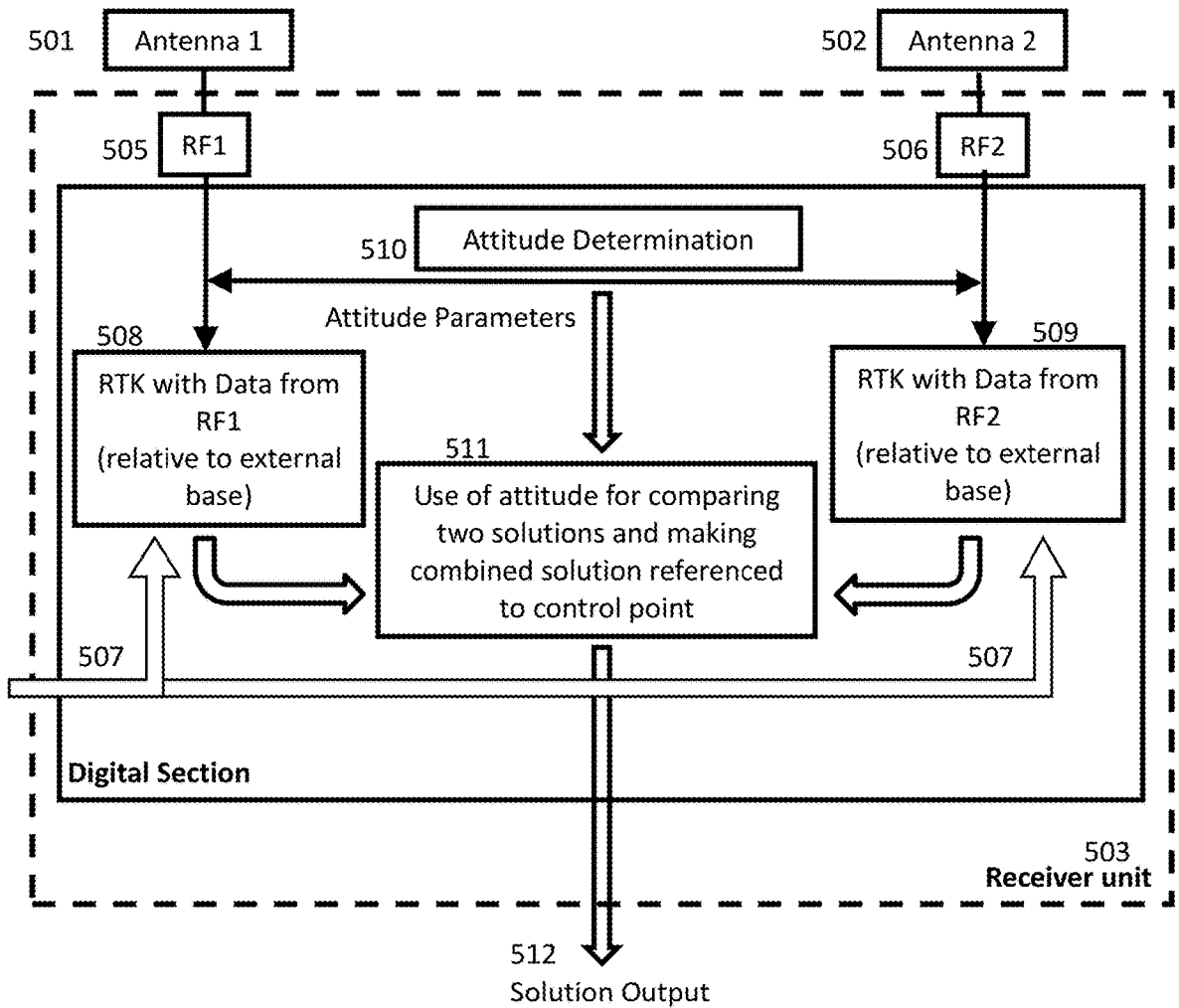
FIG. 5 shows a schematic diagram of a concept for generating solution within a receiver with multiple front-ends.

In FIG. 5 antenna 1 (501) and antenna 2 (502) are used to receive signals from a plurality of GNSS satellites. These two antennas are installed on the body of the object whose position needs to be determined. Such an object has to have a control point—a virtual or physical point, which the determined position is referenced to.

In order to reference (i.e. to recalculate) the derived GNSS position to a control point, there should be a known relationship between position of either antenna 1, or antenna 2 and a control point. This relationship can be defined via known attitude parameters. For the sake of convenience, it makes sense to assign a control point be coincident with one of the antennas. This would help to avoid recalculations of the position from one of the antennas to the control point. Let us assume in further discussion that a control point is coincident with antenna 1, though one skilled in the art can suggest different configurations.

The antenna which serves as a control point is referred to as the main antenna, other antennas are referred to as auxiliary antennas.

Two methods for improving RTK solution quality are possible within the receiver that has two or more front-ends and a common digital section. The first method (method #1) is based on combining final RTK solutions. Its logical diagram is shown in FIG. 5.

Signals from antennas 1 (501) and 2 (502) come through two RF front ends (505 and 506) to a digital section 504 of the apparatus described in the embodiments.

In the digital section 504 a standard manipulations with incoming RF signals are made: down-conversion, filtering, amplification, digitization, generating raw measurement data and digital data.

Correction data 507 come to the unit 503, being generated by external source.

The digitized data from RF1 along with correction data 507 are then processed in RTK engine 508, and the digitized data from RF2 along with correction data 507 are then processed in RTK engine 509.

Fixed solutions from RTK engines 508 and 509 are received in the functional block 511.

In parallel with the RTK engines 508 and 509, an attitude determination engine 510 is run. This attitude determination engine 510 outputs its attitude parameters to the functional block 511.

In the functional block 511 two RTK solutions from the RTK engine 508 and the RTK engine 509 are referenced (i.e. r) to a control point (antenna 1, or main in the above example) with help of attitude parameters, and a certain logic of comparing two solutions and of making a unified solution is enabled. This unified solution shall be more robust and accurate, since it is based on two independent solutions.

The resulting unified solution is output through interface 512.

Figure 6:
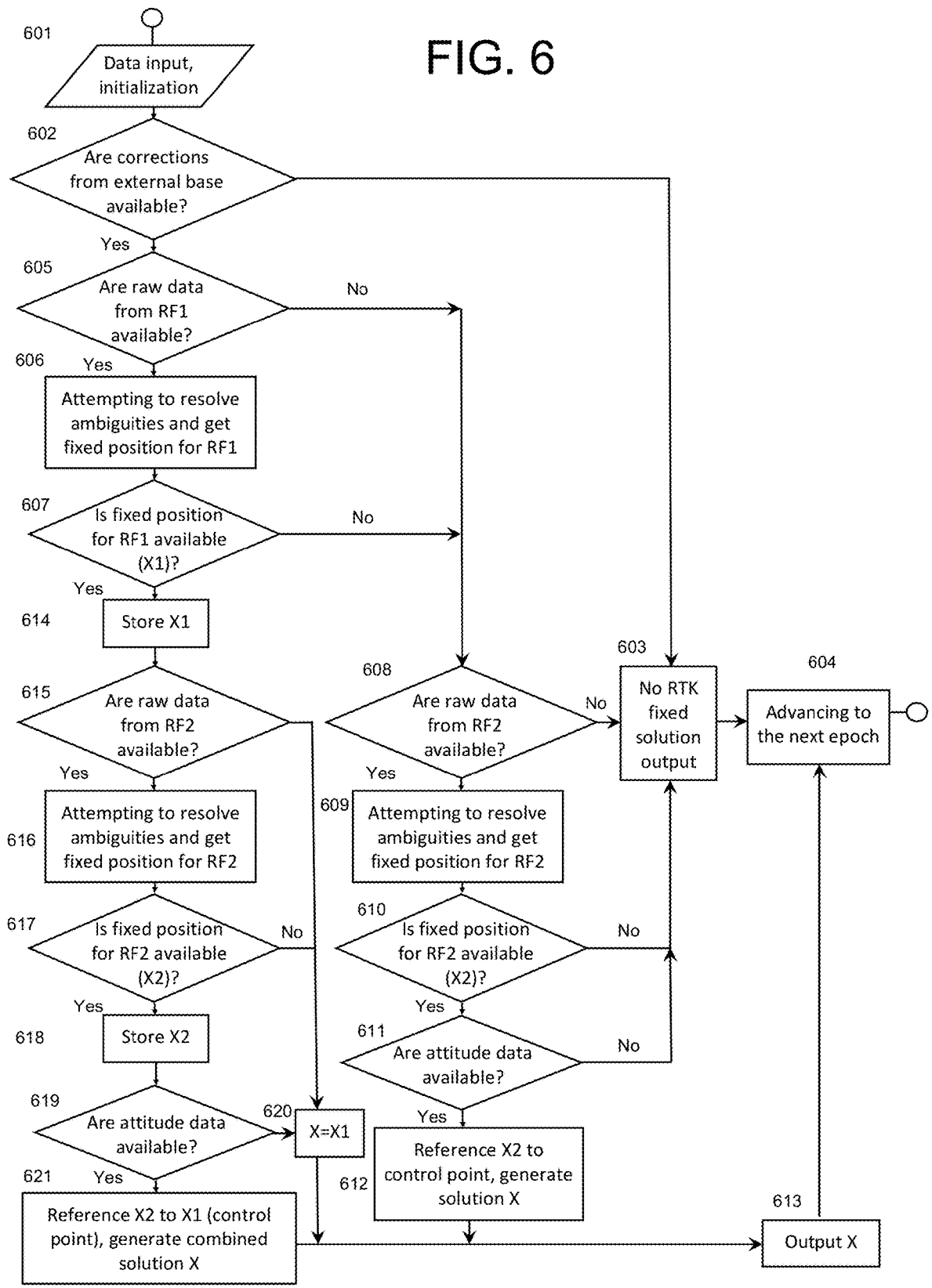
FIG. 6 shows a flowchart of a method for generating combined solution based on solutions acquired with data from two front-ends.

The full logic of the algorithm for the method #1 is explained on the flowchart shown in FIG. 6. In FIG. 6 the term "RF1" refers to data from the first front-end. The term "RF2" refers to data from the second front-end.

At step 601 all data input and all algorithms are initialized.

At step 602 a check is made if corrections from external base are available. If corrections are unavailable, then RTK solution cannot be obtained and the process goes to steps 603 and 604.

If corrections from external base are available, the process goes to the decision 605, where a check is made, if data from the first front-end (RF1) is available.

If data from RF1 is unavailable, the process goes to the decision 608, where the check is made if data from the second front-end (RF2) is available.

If data from RF2 is also unavailable, then the RTK solution cannot be obtained and the process goes to steps 603 and 604.

If data from RF2 is available at step 608, than an attempt is made to resolve ambiguities (step 609) with these data and corrections received at step 601.

If the ambiguities cannot be resolved, i.e., a fixed solution is unavailable (step 610), then the RTK fixed solution cannot be output and the process goes to steps 603 and 604.

If the ambiguities can be resolved at step 610 and the solution X2 for data from RF2 can be obtained, the process goes to a decision 611, where the check is made if attitude data is available. If the attitude data is unavailable, then the solution X2 cannot be referenced to control point, and as such, a fixed RTK solution cannot be output and the process goes to steps 603 and 604.

If the attitude data are available at step 611, the process goes to step 612, where the attitude data is used to reference solution X2 to control point X, and the resulting solution X is output at step 613, after which advancing to the next epoch occurs at step 604.

If data from RF1 is available at step 605, than an attempt is made to resolve ambiguities with this data and corrections received at step 601 (step 606).

If the ambiguities cannot be resolved (step 607), i.e., fixed solution for RF1 is unavailable, then the process goes to the step 608.

If the ambiguities can be resolved at step 606 and the solution X1 for data from RF1 is available at step 607, this solution X1 is stored (step 614), and the process goes to a decision 615 where a check is made if data from the second front-end (RF2) are available.

If data from RF2 is unavailable, then the solution X2 cannot be generated, and the process goes to step 620 where the output solution X is assigned with the solution X1 from the RF1, and the resulting solution X is output at step 613.

If data from RF2 is available at step 615, than an attempt is made (step 616) to resolve the ambiguities with this data and corrections received at step 601.

If ambiguities from RF2 cannot be resolved, i.e., a fixed solution X2 is unavailable (step 617), the solution X2 cannot be generated, and the process goes to step 620 where the output solution X is assigned with the solution X1 from the RF1, and the resulting solution X is output at step 613.

If the ambiguities for RF2 can be resolved at step 616 and the solution X2 for data from RF2 can be obtained (step 617), this solution is stored (step 618), and the process goes to a decision 619, where the check is made if attitude data are available.

If the attitude data is unavailable, then the solution X2 cannot be used, and the process goes to step 620 where the output solution X is assigned with the solution X1 from the RF1, and the resulting solution X is output at step 613.

If attitude data is available at step 619, then both X1 and X2 solutions can be used to form the combined solution and the process goes to step 621 where this combined solution X is generated and output at step 613.

One skilled in the art can built a variety of algorithms for making a combined solution (box 511 in FIG. 5, or box 621 in FIG. 6) if attitude data are available. One of the examples is described below.

Let us denote:
- $X_1(t)$—X position component derived with the data from RF1 at time instant t;
- $Y_1(t)$—Y position component derived with the data from RF1 at time instant t;
- $Z_1(t)$—Z position component derived with the data from RF1 at time instant t;
- $XV_1(t)$—X velocity component derived with the data from RF1 at time instant t;
- $YV_1(t)$—Y velocity component derived with the data from RF1 at time instant t;
- $ZV_1(t)$—Z velocity component derived with the data from RF1 at time instant t;
- $X_2(t)$—X position component derived with the data from RF2 at time instant t;
- $Y_2(t)$—Y position component derived with the data from RF2 at time instant t;
- $Z_2(t)$—Z position component derived with the data from RF2 at time instant t;
- $XV_2(t)$—X velocity component derived with the data from RF2 at time instant t;
- $YV_2(t)$—Y velocity component derived with the data from RF2 at time instant t;
- $ZV_2(t)$—Z velocity component derived with the data from RF2 at time instant t;
- $\Delta t$—time increment;
- RMS1—evaluated positioning error for solution derived with data from RF1;
- RMS2—evaluated positioning error for solution derived with data from RF2;
- Sol—a variable defining how the combined solution is generated;
- Trust1—a metric of confidence to a solution derived with data from RF1;
- Trust2—a metric of confidence to a solution derived with data from RF2;
- Lim—a certain threshold;
- Fix1—type of solution with the data from RF1;
- Fix2—type of solution with the data from RF2;

Let us assume the following meanings for values of Fix1 and Fix2:
- 0—absolute (stand-alone);
- 1—differential (DGNSS);
- 2—float;
- 3—fixed.

These values are described here for clarity, in fact, only type 3 (fixed) is of interest within the scope of the embodiments.

Let us define:
- Sol=0—no fixed solution is available, and any other available solution is output derived with data from RF1 (stand-alone, float, DGNSS);
- Sol=1—fixed solution is output, derived with data from RF1;
- Sol=2—fixed solution is output, derived with data from RF2 being referenced to control point (antenna 1) with help of attitude information.
- Sol=3—combined solution is output being based on data from RF1, RF2 and attitude information.

Let us define:
- Trust1=0 means that a solution derived with data from RF1 can be trusted;
- If Trust1 is different from zero this means that, a solution derived with data from RF1 cannot be trusted.

Similarly:
- Trust2=0 means that a solution derived with data from RF2 can be trusted;
- If Trust2 is different from zero this means that, a solution derived with data from RF2 cannot be trusted.

Then, the example algorithm can be built as follows. At first, a confidence to fixed solutions based on data from RF1 and RF2 shall be evaluated.

If:

$$Abs[(X_1(t)-X_1(t-\Delta t))/\Delta t-(VX_1(t)+VX_1(t-\Delta t))/2] \leq Lim$$

and $$Abs[(Y_1(t)-Y_1(t-\Delta t))/\Delta t-(VY_1(t)+VY_1(t-\Delta t))/2] \leq Lim$$

and $$Abs[(Z_1(t)-Z_1(t-\Delta t))/\Delta t-(VZ_1(t)+VZ_1(t-\Delta t))/2] \leq Lim$$

where Abs means determination of the absolute value,
then, the solution based on data from RF1 can be trusted (Trust1=0), otherwise, Trust1=1 (solution cannot be trusted)

Similarly, if $$Abs[(X_2(t)-X_2(t-\Delta t))/\Delta t-(VX_2(t)+VX_2(t-\Delta t))/2] \leq Lim$$

and $$Abs[(Y_2(t)-Y_2(t-\Delta t))/\Delta t-(VY_2(t)+VY_2(t-\Delta t))/2] \leq Lim$$

and $$Abs[(Z_2(t)-Z_2(t-\Delta t))/\Delta t-(VZ_2(t)+VZ_2(t-\Delta t))/2] \leq Lim$$

then, the solution based on data from RF2 can be trusted (Trust2=0), otherwise, Trust2=1 (solution cannot be trusted)

After that, we recalculate solution acquired with data from RF2 to the control point (antenna 1 in our example) using attitude data. Let us denote:
- $X'_2(t)$—recalculated to the control point position component $X_2(t)$;
- $Y'_2(t)$—recalculated to the control point position component $Y_2(t)$;
- $Z'_2(t)$—recalculated to the control point position component $Z_2(t)$;

Then, a decision shall be made about which solution should be output. The example algorithm can be described the best way in a C-code programming style. The goal is to choose the value of Sol.
Sol=0;
If(Fix1==3 && Fix2==3)
{Sol=3;
    if(Trust1!=Trust2)
    {
    if (Trust1) Sol=2;
    else Sol=1;
    }
}
else
{
    If(Fix1==3) Sol=1;
    If(Fix2==3) Sol=2;
}

If Sol is equal to 3, then a combined solution is formed as weighted average:

$$X(t)=(P_{1x} \cdot X_1(t)+P'_{2x} \cdot X'_2(t))/(P_{1x}+P'_{2x})$$

$$Y(t)=(P_{1y} \cdot Y_1(t)+P'_{2y} \cdot Y'_2(t))/(P_{1y}+P'_{2y})$$

$$Z(t)=(P_{1z} \cdot Z_1(t)+P'_{2z} \cdot Z'_2(t))/(P_{1z}+P'_{2z})$$

where:
X(t)—X position component at time instant t;
Y(t)—Y position component at time instant t;
Z(t)—Z position component at time instant t;
$P_{1x}$—weight for $X_1(t)$
$P_{1y}$—weight for $Y_1(t)$
$P_{1z}$—weight for $Z_1(t)$
$P'_{2x}$—weight for $X'_2(t)$
$P'_{2y}$—weight for $Y'_2(t)$
$P'_{2z}$—weight for $Z'_2(t)$ Weights can be assigned in a variety of ways. One of the most common approaches is to assign weight as a value reciprocal to the covariance estimate for the respective component.

In case ambiguity resolution process fails for the main or auxiliary antennas, then positions of other antennas can be used to seed a new ambiguity resolution process, where positions of other antennas are referenced to the position of antenna with the failed ambiguity resolution and with help of the known attitude.

Figure 7:
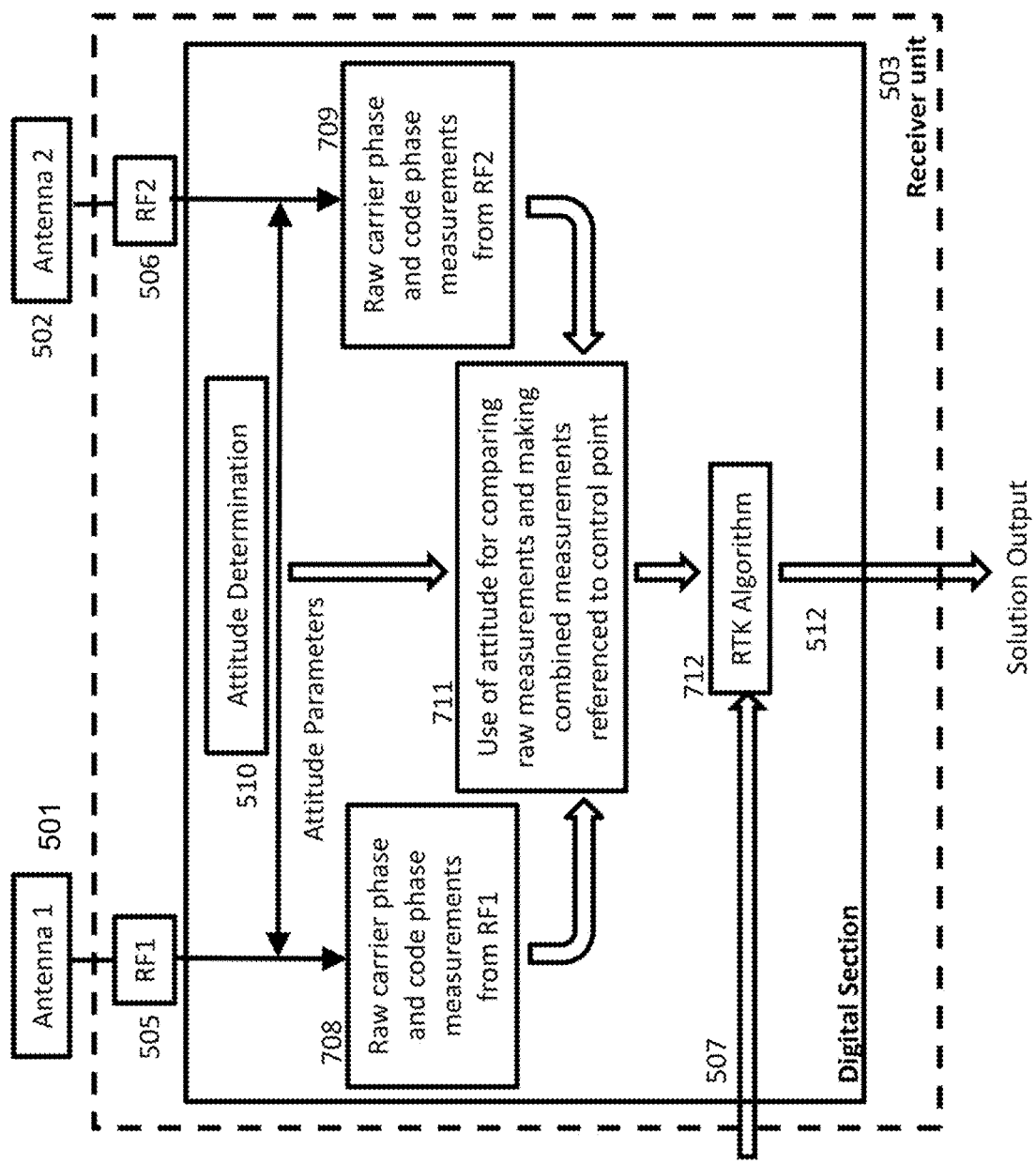
FIG. 7 shows attitude parameters within a Cartesian reference frame for a device including two GNSS antennas separated by a fixed baseline.

The second method for improving RTK solution quality (method #2) is based on combining raw carrier phase measurements. Its logical diagram is shown in FIG. 7.

Signals from antennas 1 (501) and 2 (502) come through two RF front ends (505 and 506) to a digital section 504 of the apparatus described in the embodiments.

In the digital section 504 a standard manipulations with incoming RF signals are made: down-conversion, filtering, amplification, digitization, generating raw measurement data and digital data.

As result of these manipulations raw carrier and code phase measurements 708 are available from RF1, and raw carrier and code phase measurements 709 are available from RF2. These all raw carrier and code phase measurements come to the functional block 711.

In parallel with measurement generation and processing an attitude determination engine 510 is run. This attitude determination engine outputs its attitude parameters to the functional block 711.

In the functional block 711 raw carrier and code phase measurements from different front-ends are referenced to the same control point with help of known attitude, and being referenced to the same point, measurements from different front-ends are compared to each other, consistency check is done, and as result:

combined measurements are generated;
  if consistency check was fine, respective combined measurements are accompanied with "good" status flags;
  if consistency check failed, respective combined measurements are accompanied with "bad" status flags.

Details of the processing logic for combining measurements are described below.

Combined measurements, accompanied with status flags come to the RTK algorithm, where correction data 507 from external source also come to, and the solution is generated.

The resulting unified solution is output through interface 512.

The process of combining measurements for the j-th satellite within the method #2 is possible if:
  raw measurement data for the j-th satellite are available from several front-ends simultaneously;
  attitude is known between antennas connected to these several front-ends.

Let us simplify a case to two front-ends only in further discussion. Let us denote:
$C_1^j$, $C_2^j$—code phase pseudo-range measurements made on a certain frequency with front-ends RF1 and RF2 respectively for the j-th GNSS satellite within the same receiver;
$P_1^j$, $P_2^j$—carrier phase pseudo-range measurements made on a certain frequency with front-ends RF1 and RF2 respectively for the j-th GNSS satellite within the same receiver;

Let us assume that a control point coincides with the antenna 1. Then, in case if attitude is available, raw measurement data from antenna 2 can be referenced to antenna 1. Let us denote
$C_{21}^j$—code phase measurements of RF2 referenced to control point coincident with antenna 1;
$P_{21}^j$—carrier phase measurements of RF2 referenced to control point coincident with antenna 1.

One skilled in the art can suggest various approaches for combining these measurements. The most obvious is described below.

First, form differences:

$$\Delta C^j = C_1^j - C_{21}^j \tag{11}$$

$$\Delta P^j = P_1^j - P_{21}^j \tag{12}$$

Second, compare these differences with thresholds for code phase and carrier phase differences $Tr_c$ and $Tr_p$ respectively. If the following holds true:

$$\Delta C^j \leq Tr_c \tag{13}$$

$$\Delta P^j \leq Tr_p \tag{14}$$

then, all measurements are considered good, and combined measurements can be generated.

Thresholds $Tr_c$ and $Tr_p$ can chosen in a variety of ways. For example, thresholds can be chosen based on assumptions about normal error distribution, values of measurement error standard deviations and a certain confidence level. As such, for the confidence level of 0.997 (3 sigma) thresholds are defined as follows:

$$Tr_c = 3 \times \sqrt{\sigma_{C1}^2 + \sigma_{C21}^2} \tag{15}$$

$$Tr_p = 3 \times \sqrt{\sigma_{P1}^2 + \sigma_{P21}^2} \tag{16}$$

where:

$\sigma_{C1}{}^j$—standard deviation for the j-th code phase measurement made with RF1

$\sigma_{C21}{}^j$—standard deviation for the j-th code phase measurement made with RF2 recalculated to the control point coincident with the antenna 1 with help of known attitude $\sigma_{P1}{}^j$—standard deviation for the j-th carrier phase measurement made with RF1

$\sigma_{P21}{}^j$—standard deviation for the j-th carrier phase measurement made with RF2 recalculated to the control point coincident with the antenna 1 with help of known attitude If (13) and (14) hold true, the combined measurements for the control point coincident with the antenna 1 are generated as follows:

$$C_{1C}^j = \frac{C_1^j \times W_1^j + C_{21}^j \times W_{21}^j}{W_1^j + W_{21}^j} \quad (17)$$

$$P_{1C}^j = \frac{P_1^j \times V_1^j + P_{21}^j \times V_{21}^j}{V_1^j + V_{21}^j} \quad (18)$$

where:

$W_1^j$—weight for code phase measured with RF1 (antenna 1)

$W_{21}^j$—weight for code phase measured with RF2, referenced to the control point coincident with the antenna 1

$V_1^j$—weight for carrier phase measured with RF1 (antenna 1)

$V_{21}^j$—weight for carrier phase measured with RF2, referenced to the control point coincident with the antenna 1

Weights can be assigned in a variety of ways. For the above example, it appears effective to assign weights as a function of signal-to-noise ratio (SNR) for the particular GNSS signal. For example, in "Global Positioning System: Theory and Applications, Volume II (Progress in Astronautics & Aeronautics)", 1996, by B. Parkinson, J. Spilker Jr., P. Axelrad, P. Enge, the following relationship is suggested:

$$\sigma_j^2 = \frac{1}{SNR_j} \quad (19)$$

where:

$\sigma_j^2$—error dispersion for the j-th measurement $SNR_j$—SNR for the j-th measurement As such, based on (19), the weights can be assigned as follows:

$$w_1^j = v_1^j = SNR_1^j \quad (20)$$

$$w_{21}^j = v_{21}^j = SNR_2^j \quad (21)$$

where $SNR_1^j$ and $SNR_2^j$ are signal-to-noise ratios evaluated for the j-th measurement collected with antenna 1 and antenna 2 respectively.

If the inequalities (13) and (14) do not hold true, then either j-th measurement from RF1, or j-th measurement from RF2 contain an anomalous error, and it is impossible to distinguish which front-end is giving an anomalous measurement. If so, j-th measurements from both RF1 and RF2 should be rejected and not used in generating a solution.

As an alternative, if the inequalities (13) and (14) do not hold true, respective measurements can be assigned smaller weights, for example, inversely proportional to a squared value of $\Delta C^j$ for code phase measurements, or to a squared value of $\Delta P^j$—for carrier phase measurements.

$$w_1^j = w_{21}^j = \frac{1}{\Delta C^{j2}} \quad (22)$$

$$v_1^j = v_{21}^j = \frac{1}{\Delta P^{j2}} \quad (23)$$

When weights are re-assigned, combined measurements can be generated in accordance with (17) and (18) and used in generating the RTK solution.

Attitude determination (block 510 in FIG. 5, 7, and steps 619 and 611 in FIG. 6) is the important part of the algorithm. Attitude can be acquired from external sensors, like an inertial measurement unit (IMU), or it can be calculated based on carrier phase measurements collected from two or more antennas connected to different front ends.

A fact that the receiver has a single digital section is beneficial for the present case, as it allows for determining an attitude with better reliability and accuracy, compared with using two independent receivers instead.

These benefits originate from the fact that a common clock is used to generate measurements from different front-ends, and as such, only two unknowns—two attitude angles are to be determined, while all other variables cancel out.

Figure 8:
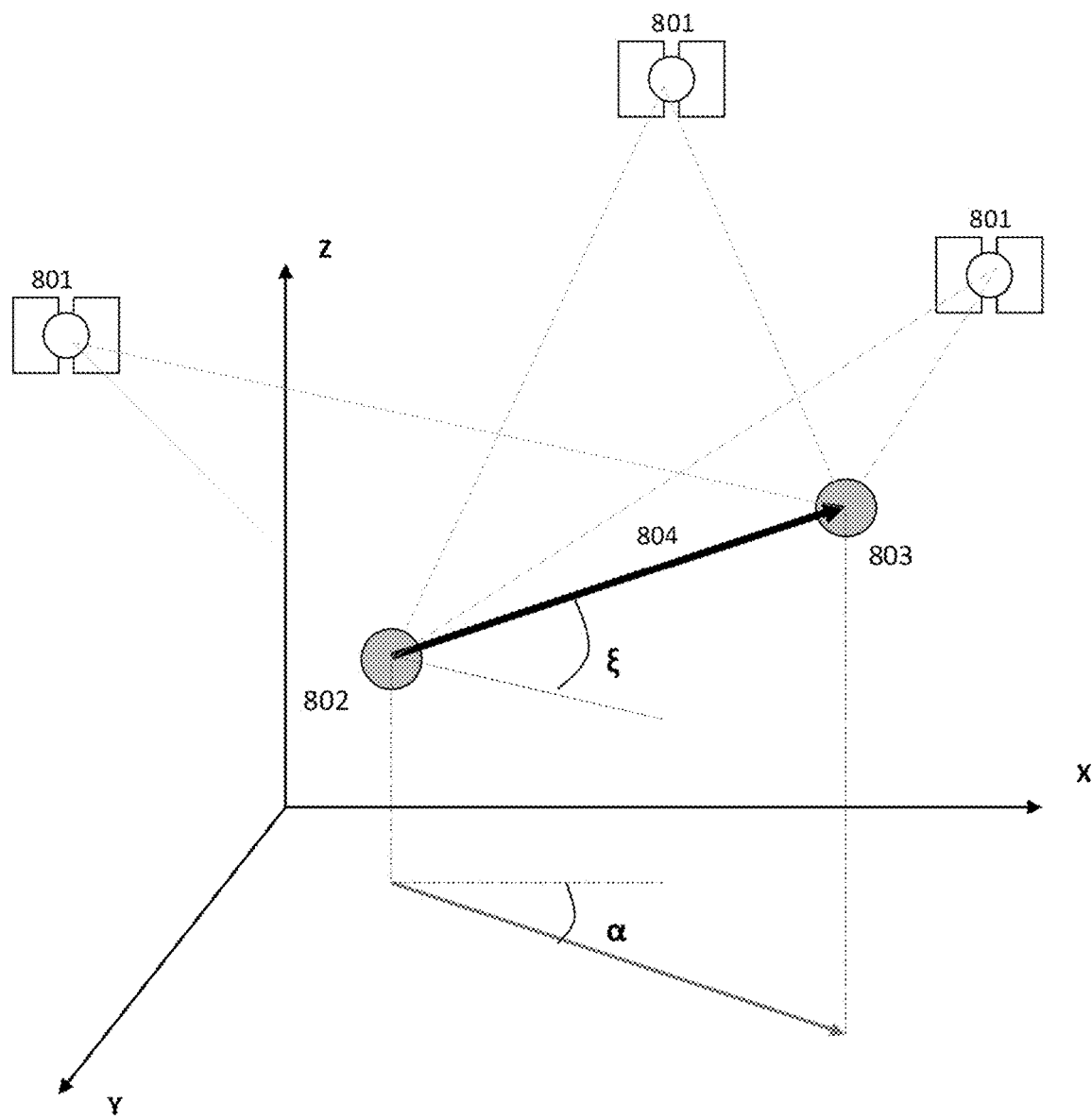
FIG. 8 shows a flowchart of a method for initializing the attitude.

An algorithm for attitude determination based on GNSS carrier phase measurements collected with a receiver with two and more front ends, and a single digital section is described below. FIG. 8 illustrates the geometry for the example with two front-ends, the same approach can be extended to bigger number of front ends.

FIG. 8 shows a plurality of GNSS satellites 801 that broadcast GNSS signals.

The GNSS signals are then received with two antennas 802 and 803, divided by a known baseline 804. The goal is to determine angles $\xi$ and $\alpha$, such that:

$\xi$—elevation (or pitch)—an angle between the vector from 802 to 803 and a horizontal plane;

$\alpha$—azimuth (or heading)—an angle between the projection of 804 to horizontal plane and the X-axis (usually, the X-axis is pointed to the North).

The Coordinate system in FIG. 8 is Cartesian, and its origin and the axes directions are chosen depending on user needs, but typically, in attitude determination scenario the origin coincides with a certain point on the Earth surface, X-axis is directed to the local North, Z-axis is directed to the local zenith, Y-axis is directed to the local East.

An equation system (24) below relates full carrier phase differences (in cycles) measured with two antennas 802 and 803 to two attitude angles and a:

$$\begin{cases} \Delta\varphi_1 = \frac{D}{\lambda}\begin{bmatrix} \cos(\xi)\cos(\alpha)\cos(\xi_{SV1})\cos(\alpha_{SV1}) + \\ +\cos(\xi)\sin(\alpha)\cos(\xi_{SV1})\sin(\alpha_{SV1}) + \sin(\xi)\sin(\xi_{SV1}) \end{bmatrix} \\ \cdots \\ \Delta\varphi_j = \frac{D}{\lambda}\begin{bmatrix} \cos(\xi)\cos(\alpha)\cos(\xi_{SVj})\cos(\alpha_{SV1}) + \\ +\cos(\xi)\sin(\alpha)\cos(\xi_{SVj})\sin(\alpha_{SVj}) + \sin(\xi)\sin(\xi_{SVj}) \end{bmatrix} \\ \cdots \\ \Delta\varphi_N = \frac{D}{\lambda}\begin{bmatrix} \cos(\xi)\cos(\alpha)\cos(\xi_{SVN})\cos(\alpha_{SVN}) + \\ +\cos(\xi)\sin(\alpha)\cos(svEl_N)\sin(\xi_{SVN}) + \sin(\xi)\sin(\xi_{SVN}) \end{bmatrix} \end{cases} \quad (24)$$

where:

D—known baseline 804

λ—carrier phase wavelength $\xi_{SVj}$ and $\alpha_{SVj}$—elevation and azimuth of the j-th GNSS satellite within the reference frame of the FIG. 7

N—total number of GNSS carrier phase measurements for a given instant.

As it follows from (24), the relationship between full carrier phase differences and attitude parameters is not linear:

$$\Delta \vec{\varphi} = f(\xi, \alpha, \vec{\xi}_{SV}, \vec{\alpha}_{SV}) \qquad (25)$$

In order to determine an attitude, the equation system (24) should be linearized. Using Taylor's expansion and retaining the 1-st order terms, based on equation (2) we obtain:

$$\nabla \Delta \vec{\varphi} = \Delta \vec{\varphi} - f(\xi_0, \alpha_0, \vec{\xi}_{SV}, \vec{\alpha}_{SV}) = \frac{df(\xi_0, \alpha_0, \vec{\xi}_{SV}, \vec{\alpha}_{SV})}{d\xi}(\xi - \xi_0) + \\ + \frac{df(\xi_0, \alpha_0, \vec{\xi}_{SV}, \vec{\alpha}_{SV})}{d\alpha}(\alpha - \alpha_0) \qquad (26)$$

where $\xi_0, \alpha_0$—initial guess, or approximate values of unknowns, acting as a linearization point.

Taking into account (26), equation (24) can be rewritten as follows:

$$\begin{cases} \nabla \Delta \varphi_1 = \frac{D}{\lambda} \\ \begin{bmatrix} \sin(\xi_0)\cos(\alpha_0)\cos(\xi_{SV1})\cos(\alpha_{SV1})\Delta\xi + \\ \sin(\xi_0)\sin(\alpha_0)\cos(\xi_{SV1})\sin(\alpha_{SV1})\Delta\xi - \cos(\xi_0)\sin(\xi_{SV1})\Delta\xi \end{bmatrix} + \\ \frac{D}{\lambda}\begin{bmatrix} \cos(\xi_0)\sin(\alpha_0)\cos(\xi_{SV1})\cos(\alpha_{SV1})\Delta\alpha - \\ \cos(\xi_0)\cos(\alpha_0)\cos(\xi_{SV1})\cos(\alpha_{SV1})\Delta\alpha \end{bmatrix} \\ \dots \\ \nabla \Delta \varphi_j = \frac{D}{\lambda} \\ \begin{bmatrix} \sin(\xi_0)\cos(\alpha_0)\cos(\xi_{SVj})\cos(\alpha_{SVj})\Delta\xi + \\ \sin(\xi_0)\sin(\alpha_0)\cos(\xi_{SVj})\sin(\alpha_{SVj})\Delta\xi - \cos(\xi_0)\sin(\xi_{SVj})\Delta\xi \end{bmatrix} + \\ \frac{D}{\lambda}\begin{bmatrix} \cos(\xi_0)\sin(\alpha_0)\cos(\xi_{SVj})\cos(\alpha_{SVj})\Delta\alpha - \\ \cos(\xi_0)\cos(\alpha_0)\cos(\xi_{SVj})\cos(\alpha_{SVj})\Delta\alpha \end{bmatrix} \\ \dots \\ \nabla \Delta \varphi_N = \frac{D}{\lambda} \\ \begin{bmatrix} \sin(\xi_0)\cos(\alpha_0)\cos(\xi_{SVN})\cos(\alpha_{SVN})\Delta\xi + \\ \sin(\xi_0)\sin(\alpha_0)\cos(\xi_{SVN})\sin(\alpha_{SVN})\Delta\xi - \cos(\xi_0)\sin(\xi_{SVN})\Delta\xi \end{bmatrix} + \\ \frac{D}{\lambda}\begin{bmatrix} \cos(\xi_0)\sin(\alpha_0)\cos(\xi_{SVN})\cos(\alpha_{SVN})\Delta\alpha - \\ \cos(\xi_0)\cos(\alpha_0)\cos(\xi_{SVN})\cos(\alpha_{SVN})\Delta\alpha \end{bmatrix} \end{cases} \qquad (27)$$

where:

$\Delta \xi = \xi - \xi_0$ $\Delta \alpha = \alpha - \alpha_0$.

Let us represent equation (27) in a matrix form:

$$\nabla \Delta \vec{\varphi} = H \times \Delta \gamma$$

where:

H is the so called geometry matrix, such that $$H = \begin{Bmatrix} h_{11} & h_{12} \\ \dots & \dots \\ h_{j1} & h_{j2} \\ \dots & \dots \\ h_{N1} & h_{N2} \end{Bmatrix}$$

$$h_{j1} = \frac{D}{\lambda}\sin(\xi_0)\cos(\alpha_0)\cos(\xi_{SVj})\cos(\alpha_{SVj}) + \\ \sin(\xi_0)\sin(\alpha_0)\cos(\xi_{SVj})\sin(\alpha_{SVj}) - \cos(\xi_0)\sin(\xi_{SVj})$$

$$h_{j2} = \frac{D}{\lambda}[\cos(\xi_0)\sin(\alpha_0)\cos(\xi_{SVj})\cos(\alpha_{SVj}) - \\ \cos(\xi_0)\cos(\alpha_0)\cos(\xi_{SVj})\sin(\alpha_{SVj})]$$

$$\nabla \Delta \vec{\phi} = \begin{Bmatrix} \nabla \Delta \varphi_1 \\ --- \\ \nabla \Delta \varphi_j \\ --- \\ \nabla \Delta \varphi_N \end{Bmatrix}$$

$$\Delta \gamma = \begin{Bmatrix} \Delta \xi \\ \Delta \alpha \end{Bmatrix} \qquad (28)$$

Applying the least-squares method (LSM) to (28) we get:

$$\Delta \gamma = (H^T R^{-1} H)^{-1} H^T R \nabla \Delta \vec{\varphi} \qquad (29)$$

where:

R—covariance matrix for $\nabla \Delta \vec{\varphi}$.

Finally, attitude parameters are computed as follows:

$$\xi = \xi_0 + \Delta \xi$$

$$\alpha = \alpha_0 + \Delta \alpha \qquad (30)$$

Covariance matrix for attitude parameters reads:

$$\Re = (H^T R^{-1} H)^{-1} \qquad (31)$$

The above algorithm ((27)-(29)) can be optimized in order to reduce computational load and avoid matrix manipulations.

Let us look at (29) and denote:

$$A = H^T R^{-1} H, \qquad (32)$$

Let us assume, that a measurement covariance matrix has a form of:

$$R = \begin{bmatrix} r_{11} & \dots & 0 & \dots & 0 \\ \dots & \dots & \dots & \dots & \dots \\ 0 & \dots & r_{jj} & \dots & 0 \\ \dots & \dots & \dots & \dots & \dots \\ 0 & \dots & 0 & \dots & r_{NN} \end{bmatrix} \qquad (33)$$

Where $r_{jj}$—dispersion for j-th measurement

Taking into account (33) and a matrix H components, equation (32) yields the following values for A-matrix components:

$$A = \begin{bmatrix} \frac{h_{11}^2}{r_{11}} + \ldots + \frac{h_{j1}^2}{r_{jj}} + \ldots + \frac{h_{N1}^2}{r_{NN}} & \frac{h_{11}h_{12}}{r_{11}} + \ldots + \frac{h_{j1}h_{j12}}{r_{jj}} + \ldots + \frac{h_{N1}h_{N2}}{r_{NN}} \\ \frac{h_{11}h_{12}}{r_{11}} + \ldots + \frac{h_{j1}h_{j2}}{r_{jj}} + \ldots + \frac{h_{N1}h_{N2}}{r_{NN}} & \frac{h_{12}^2}{r_{11}} + \ldots + \frac{h_{j2}^2}{r_{jj}} + \ldots + \frac{h_{N2}^2}{r_{NN}} \end{bmatrix} \quad (34)$$

Let us denote:

$$A = \begin{bmatrix} a_{11} & a_{12} \\ a_{21} & a_{22} \end{bmatrix} \quad (35)$$

such, that according to (34):

$$a_{11} = \frac{h_{11}^2}{r_{11}} + \ldots + \frac{h_{j1}^2}{r_{jj}} + \ldots + \frac{h_{N1}^2}{r_{NN}} \quad (36)$$

$$a_{12} = \frac{h_{11}h_{12}}{r_{11}} + \ldots + \frac{h_{j1}h_{j12}}{r_{jj}} + \ldots + \frac{h_{N1}h_{N2}}{r_{NN}} \quad (37)$$

$$a_{21} = \frac{h_{11}h_{12}}{r_{11}} + \ldots + \frac{h_{j1}h_{j2}}{r_{jj}} + \ldots + \frac{h_{N1}h_{N2}}{r_{NN}} \quad (38)$$

$$a_{22} = \frac{h_{12}^2}{r_{11}} + \ldots + \frac{h_{j2}^2}{r_{jj}} + \ldots + \frac{h_{N2}^2}{r_{NN}} \quad (39)$$

Let us denote $B = A^{-1}$, then:

$$B = \begin{bmatrix} b_{11} & b_{12} \\ b_{21} & b_{22} \end{bmatrix} = \begin{bmatrix} \frac{a_{22}}{a_{11}a_{22} - a_{12}a_{21}} & \frac{-a_{12}}{a_{11}a_{22} - a_{12}a_{21}} \\ \frac{-a_{21}}{a_{11}a_{22} - a_{12}a_{21}} & \frac{a_{11}}{a_{11}a_{22} - a_{12}a_{21}} \end{bmatrix} \quad (40)$$

Let us denote $G = BH^T R^{-1}$, then:

$$G = \begin{Bmatrix} g_{11} & \cdots & g_{1i} & \cdots & g_{1N} \\ g_{21} & \cdots & g_{2i} & \cdots & g_{2N} \end{Bmatrix} = \begin{Bmatrix} (b_{11}h_{11} + b_{12}h_{12})/r_{11} & \cdots & (b_{11}h_{i1} + b_{12}h_{i2})/r_{ii} & \cdots & (b_{11}h_{N1} + b_{12}h_{N2})/r_{NN} \\ (b_{21}h_{11} + b_{22}h_{12})/r_{11} & \cdots & (b_{21}h_{i1} + b_{22}h_{i2})/r_{ii} & \cdots & (b_{211}h_{N1} + b_{22}h_{N2})/r_{NN} \end{Bmatrix} \quad (41)$$

Finally, equation (29) reduces to equation (42) below, where matrix multiplications and inversion are avoided:

$$\Delta\gamma = G\nabla\Delta\vec{\varphi} \quad (42)$$

When the solution is found, one should evaluate how consistent is it. The consistency check is possible if redundant measurements are available, and thus, residuals can be generated. In matrix form residuals are generated as follows:

$$S = \nabla\Delta\vec{\varphi} - H\Delta\gamma = \nabla\Delta\vec{\varphi} - H(H^T R^{-1} H)^{-1} H^T R \nabla\Delta\vec{\varphi} = \\ = [I - H(H^T R^{-1} H)^{-1} H^T R]\nabla\Delta\vec{\varphi} \quad (43)$$

where:
S—vector of residuals such, that:

$$S = \begin{Bmatrix} \theta_1 \\ \ldots \\ \theta_j \\ \ldots \\ \theta_N \end{Bmatrix} \quad (44)$$

$\theta_i$—residual for individual measurement.
Then, a sum of weighted squared residuals is:

$$s = \sum_{j=1}^{N} \left( \frac{\theta_i^2}{R_{jj}} \right) \quad (45)$$

where
$R_{jj}$—is the diagonal element of the covariance matrix R

Assuming a normal distribution law for the measurement errors of the $\nabla\Delta\vec{\varphi}$-vector components, the sum of weighted squared residuals should follow the chi-squared ($\chi^2$) distribution law with a number of degrees of freedom equal to r=N−2, where 2—number of unknowns.

Assuming the centralized chi-squared ($\chi^2$) distribution law, the value of s should not exceed a certain threshold, corresponding to a certain confidence probability level β:

$$s \leq \chi^2_\beta(r; 0) \quad (46)$$

If the condition (46) holds true, a decision is made that a solution is consistent. Such a solution can be output and used.

If condition (46) does not hold true, and the s-value is above the threshold, i.e.

$$s > \chi^2_\beta(r; 0) \quad (47)$$

a hypothesis of a presence of anomalous errors within the $\nabla\Delta\vec{\varphi}$-vector components is accepted.

If the hypothesis on presence of anomalous errors within the $\nabla\Delta\vec{\varphi}$-vector components is accepted, an attempt should be made to detect anomalous measurements and exclude them.

The process of detecting anomalous measurements is made as follows:
the biggest residual among $\theta_i$ is searched and the associated measurement is excluded from the processing, then equations (29) or (42) are solved with the reduced measurement set;
the sum of squared residuals, computed with (45) is checked against $\chi^2$ threshold, and if (46) holds true, a new solution is considered consistent, if (47) holds true instead, then the biggest residual among reduced $\theta_i$-vector is searched again and the associated measurement is excluded from the processing;

then equations (29) or (42) are solved again, and conditions (46) or (47) are checked;

this process is repeated, until the number of remaining measurements is equal to, for example, N/2;

if a number of remaining measurements is equal to N/2, and condition (47) still holds true, a decision is made that a consistent solution cannot be found with this measurement set If a consistent solution is finally found, it is substituted into the formula (43) in order to calculate the final vector of residuals for all measurements. These final residuals serve as an extra indicators of quality, which characterize measurements differenced between different front ends of the same receiver.

Despite these indicators characterize, namely measurements differenced between different front ends, they can be used to characterize measurements differenced between either front end and a distant base.

One skilled in the art can suggest various ways of using such quality indicators. For example, if a residual is above a certain threshold, associated differenced measurements are rejected out of the processing. For GNSS code phase and carrier phase measurements this threshold can be chosen equal, for example, to 5 m, or 0.2 cycles respectively.

Alternatively, residuals can be used for computing weights of associated measurements. For example:

$$w_j = \frac{1}{\theta_j^2} \quad (35)$$

where
$w_j$—weight for the j-th measurement

Equations (24)-(42) represent the general case. In this general case vector $\vec{\nabla\Delta\varphi}$ contains full carrier phase differences. This means that equations (24)-(42) work if integer ambiguities are excluded out of the $\vec{\nabla\Delta\varphi}$-vector. This requires an AR process. However, the AR process has well-known disadvantages described above, so it should be avoided, when possible.

In order to avoid the process of AR in the course of attitude determination, an approach described further below is suggested.

The main idea is to initialize the attitude at first step (using AR), but then to only use fractional carrier phases in order to calculate the attitude without AR.

As result of initialization, parameters $\xi_0, \alpha_0$ should be determined with good accuracy—roughly 1°-3°. As far as initialization requires AR, a standard RTK-like approach can be used for this, based on data received from RF1 and RF2.

After an attitude was initialized, no AR is required and an attitude determination is maintained with use of fractional parts of carrier phase differences $\vec{\nabla\Delta\varphi}$.

The main disadvantage of this approach is that very fast attitude evolutions might lead to loss of initialization. If initialization is lost, attitude should be initialized again using the procedure of AR.

Attitude evolution might be considered fast and leading to the loss of initialization if they cause advance in carrier phase differences between RF1 and RF2 by more than half a cycle (~0.1 m for GNSS case) between two successive epochs. For example, for distance between antennas of RF1 and RF2 equal to ~1 m, advance of 0.1 m in carrier phase differences is equivalent to a change in attitude by ~6°.

Assuming a 10 Hz update rate, then an object should rotate faster than 60° per second to present a problem for maintaining attitude initialization. So, for the majority of land-based applications, assuming 10 Hz and bigger update rates, the suggested method works fine.

Figure 9:
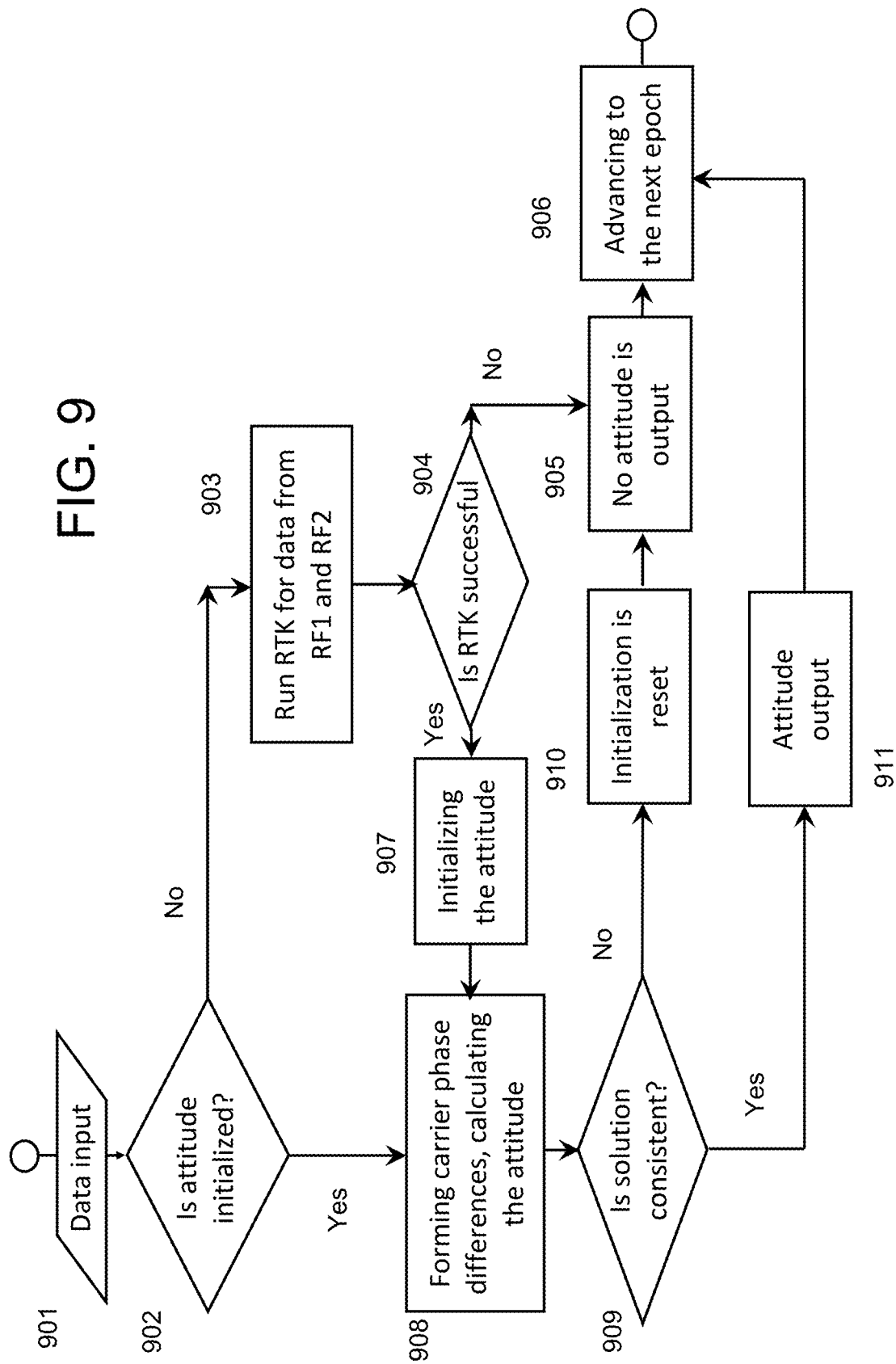

Details are given in FIG. 9. At step 901 data from RF1 and RF2 are input.

At step 902 a check is made if the attitude was previously initialized.

If the attitude was not initialized, control goes to step 903, where RTK algorithm is run to determine components of the baseline vector between antennas connected to RF1 and RF2.

At step 904 a check is made if RTK was successful, i.e., if ambiguities were resolved, and if a baseline vector between antennas connected to RF1 and RF2 is determined.

If RTK failed to properly resolve ambiguities, than no attitude is available (905), and the process advances to the next measurement epoch (906).

If RTK resolved ambiguities correctly, and a vector between antennas connected to RF1 and RF2 is determined, the process goes to step 907, where components of the baseline vector are used to compute attitude parameters, and thus, attitude is considered initialized.

Initialized attitude is used at step 908 where it is corrected with carrier phase differences processed with an algorithm described by formulas (29) or (42).

At step 909 a solution consistency check ((43)-(47)) is made based on solution residuals statistics, and if solution is considered consistent, attitude is output (911), and the process advances to the next measurement epoch (906).

If the solution is considered inconsistent—control goes to step 910, where initialization is reset, and no solution is output (905).

At step 902, if the attitude was previously initialized, control goes to step 908.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A high performance positioning system comprising:
   a global navigation satellite system (GNSS) receiver, the receiver including
      a first radio-frequency front-end (RF1) connected to a main antenna;
      a second radio-frequency front-end (RF2) connected to an auxiliary antenna;
      a digital section connected to both RF1 and RF2;
   wherein the digital section
      (i) generates a first set of GNSS raw measurements based on signals received from RF1;
      (ii) generates a second set of GNSS raw measurements based on signals received from RF2;
      (iii) computes coordinates of the main antenna based on the first set of GNSS raw measurements;
      (iv) computes coordinates of the auxiliary antenna based on the second set of GNSS raw measurements;
      (v) computes a spatial attitude of a baseline between main and auxiliary antennas, using the first and the second sets of GNSS raw measurements, and based on carrier phase integer ambiguity resolution;

(vi) continues updating the spatial attitude using the first and the second sets of GNSS raw measurements without carrier phase integer ambiguity resolution, and using fractional carrier phases;

(vii) uses the updated spatial attitude to calculate alternative coordinates of the main antenna using known coordinates of the auxiliary antenna from (iv);

(viii) generates coordinates of the main antenna by averaging the coordinates of the main antenna computed in (iii) and the alternative coordinates from (vii).

2. The system of claim 1, further comprising means for receiving GNSS differential correction data from a base station, wherein the coordinates of the main antenna in (iii) and the coordinates of the auxiliary antenna in (iv) are computed in differential mode, or in real-time kinematics (RTK) mode with carrier phase ambiguity resolution.

3. The system of claim 2, wherein, when the computing of the coordinates of the main antenna in (iii) fails due to improper ambiguity resolution, but the coordinates of the auxiliary antenna are successfully computed in (iv), and the spatial attitude is successfully updated in (vi), then the updated spatial attitude is applied in (vii) to compute the coordinates of the main antenna, without performing (viii).

4. The system of claim 2, wherein the means for receiving the GNSS differential correction data is any of a network modem for receiving the differential correction data from a base station over a network, or an antenna and a separate front end for receiving the differential correction data from a base station over a wireless link.

5. The system of claim 1, wherein (iii), (iv), (v), (vi), (vii) and (viii) utilize GNSS data from additional front ends.

6. The system of claim 1, wherein the coordinates of the main antenna are computed in (vii) based on weighted average of the coordinates of the main antenna computed in (iii) and the alternative coordinates calculated in (vii) with weights assigned inversely proportional to estimated squared errors of the computed coordinates in (iii) and (vii).

7. The system of claim 1, wherein the computing of the spatial attitude in (v) and the updating the spatial attitude in (vi) uses a known baseline length between the main and auxiliary antennas.

8. The system of claim 1, wherein the updating of the spatial attitude in (vi) is based on estimating only two unknowns due to using a common clock for controlling RF1 and RF2 within the digital section.

9. The system of claim 1 where in the process of computing coordinates of the main antenna in (viii) a consistency check is made such, that if coordinates of the main antenna computed in (iii) do not match the alternative calculated in (vii), the computed coordinates of the main antenna are either marked as inconsistent, or accompanied with an accuracy estimations proportional to that mismatch.

10. A high performance positioning system comprising:
a global navigation satellite system (GNSS) receiver, the receiver including
a first radio-frequency front-end (RF1) connected to a main antenna;
a second radio-frequency front-end (RF2) connected to an auxiliary antenna;
a digital section connected to both RF1 and RF2;
wherein the digital section
(i) generates a first set of GNSS raw measurements based on signals received from RF1;
(ii) generates a second set of GNSS raw measurements based on signals received from RF2;

(iii) computes a spatial attitude of a baseline between main and auxiliary antennas, using the first and the second sets of GNSS raw measurements, and based on carrier phase integer ambiguity resolution;

(iv) continues updating the spatial attitude using the first and the second sets of GNSS raw measurements without carrier phase integer ambiguity resolution, and using fractional carrier phases;

(v) uses the updated spatial attitude from (iv) to calculate a third set of GNSS raw measurements for the main antenna using the second set of GNSS raw measurements from (ii);

(vi) generates a fourth set of GNSS raw measurements as result of averaging the first set of GNSS raw measurements and the third set of GNSS raw measurements; and (vii) computes the coordinates of the main antenna based on the fourth set of GNSS raw measurements.

11. The system of claim 10, further comprising means for receiving GNSS differential correction data from a base station, wherein the coordinates of the main antenna in (vii) are computed in differential mode, or in real-time kinematics (RTK) mode with carrier phase ambiguity resolution.

12. The system of claim 10, wherein, the first set of GNSS raw measurements misses data for some GNSS satellites, whose data is present in the second set of GNSS raw measurements, and the spatial attitude is successfully updated in (iv), then while generating the fourth set of GNSS raw measurements in (vi), the data for missed GNSS satellites is generated by copying it from the third set of GNSS raw measurements.

13. The system of claim 11, wherein the means for receiving the GNSS differential correction data is any of a network modem for receiving the differential correction data from a base station over a network, or an antenna and a separate front end for receiving the differential correction data from a base station over a wireless link.

14. The system of claim 10, wherein (iii), (iv), (v), (vi), and (vii) utilize GNSS data from additional front ends.

15. The system of claim 10, wherein the fourth set of GNSS raw measurements from (vi) is based on a weighted average of the first set of GNSS raw measurements and the third set of GNSS raw measurements with weights assigned inversely proportional to estimated squared errors of the measurements.

16. The system of claim 10, wherein the computing of the spatial attitude in (iii) and the updating the spatial attitude in (iv) uses a known baseline length between the main and auxiliary antennas.

17. The system of claim 10, wherein the updating of the spatial attitude in (iv) is based on estimating only two unknowns due to using a common clock for controlling RF1 and RF2 within the digital section.

18. The system of claim 10, wherein, in the process of computing the fourth set of GNSS raw measurements in (vi), a consistency check is performed such that if one of the measurements from the first set of GNSS raw measurements does not match a corresponding measurement from the third set of the GNSS raw measurements, the respective measurement in the fourth set of GNSS raw measurements is either marked as inconsistent, or accompanied with an accuracy estimation proportional to that mismatch.

19. A high performance attitude determination system comprising:
- a global navigation satellite system (GNSS) receiver, the receiver including
  - a first radio-frequency front-end (RF1) connected to a main antenna;
  - a second radio-frequency front-end (RF2) connected to an auxiliary antenna;
  - a digital section connected to both RF1 and RF2;
- wherein the digital section
  - (i) generates a first set of GNSS raw measurements based on signals received from RF1;
  - (ii) generates a second set of GNSS raw measurements based on signals received from RF2;
  - (iii) computes a spatial attitude of a baseline between main and auxiliary antennas, using the first and the second sets of GNSS raw measurements, and based on carrier phase integer ambiguity resolution;
  - (iv) continues updating the spatial attitude using the first and the second sets of GNSS raw measurements without carrier phase integer ambiguity resolution, and using fractional carrier phases.

20. The system of claim 19, further including inertial measurement unit (IMU), wherein IMU is initialized with the spatial attitude updated in (iv), and is used to smooth the attitude determination results while updating in (iv).

21. The system of claim 20, wherein the IMU is used to provide attitude determination if the process of updating the spatial attitude in (iv) has failed.

22. The system of claim 19, wherein the computing of the spatial attitude in (iii) and the updating the spatial attitude in (iv) uses a known baseline length between the main and auxiliary antennas.

23. The system of claim 19, wherein the updating of the spatial attitude in (iv) is based on estimating only two unknowns due to using a common clock for controlling RF1 and RF2 within the digital section.

* * * * *